(12) United States Patent
Cappelle et al.

(10) Patent No.: US 9,476,207 B2
(45) Date of Patent: Oct. 25, 2016

(54) PANEL

(71) Applicant: FLOORING INDUSTRIES LIMITED, SARL, Bertrange (LU)

(72) Inventors: Mark Cappelle, Staden (BE); Pieter Devos, Koolskamp (BE)

(73) Assignee: FLOORING INDUSTRIES LIMITED, SARL, Bertrange (LU)

( * ) Notice: Subject to any disclaimer, the term of this patent is extended or adjusted under 35 U.S.C. 154(b) by 0 days.

(21) Appl. No.: 14/370,284

(22) PCT Filed: Nov. 16, 2012

(86) PCT No.: PCT/IB2012/056491
§ 371 (c)(1),
(2) Date: Jul. 2, 2014

(87) PCT Pub. No.: WO2013/102803
PCT Pub. Date: Jul. 11, 2013

(65) Prior Publication Data
US 2015/0047284 A1 Feb. 19, 2015

Related U.S. Application Data

(60) Provisional application No. 61/664,330, filed on Jun. 26, 2012, provisional application No. 61/585,798, filed on Jan. 12, 2012.

(30) Foreign Application Priority Data

Jan. 5, 2012 (BE) .................................. 2012/0007

(51) Int. Cl.
*E04F 15/02* (2006.01)
*E04C 2/10* (2006.01)
(Continued)

(52) U.S. Cl.
CPC ........... *E04F 15/02038* (2013.01); *E04C 2/10* (2013.01); *E04C 2/30* (2013.01);
(Continued)

(58) Field of Classification Search
CPC .............. E04F 15/02; E04F 15/02038; E04F 15/02022; E04F 15/04; E04F 15/02005; E04F 2201/0138; E04F 2201/0523; E04F 2201/0146; E04C 2002/004; F16B 5/0084; F16B 5/0056
USPC ........... 52/582.1, 582.2, 584.1, 586.1, 586.2, 52/592.1
See application file for complete search history.

(56) References Cited

U.S. PATENT DOCUMENTS 6,647,690 B1 * 11/2003 Martensson ............ E04F 15/02
52/489.1
6,769,835 B2   8/2004 Stridsman
(Continued)

FOREIGN PATENT DOCUMENTS

CA          991373 A1     6/1976
DE       200 08 708 U1    9/2000
(Continued)

OTHER PUBLICATIONS

Search Report of Belgium Application No. BE 201200007, filed Jan. 5, 2012.
(Continued)

*Primary Examiner* — Brian Glessner
*Assistant Examiner* — Adam Barlow
(74) *Attorney, Agent, or Firm* — Workman Nydegger

(57) ABSTRACT

A panel, with a horizontally and vertically active locking system, which allows two of such floor panels to be connected to each other at their sides by providing one of these floor panels, by means of a downward movement. The vertically active locking element comprises a locking element in the form of an insert and comprises at least a pivotable lock-up body and an attachment portion. The pivotable lock-up body and the attachment portion, in the non-coupled condition, horizontally extend at least for a part underneath each other and maintain a vertical mutual distance.

8 Claims, 12 Drawing Sheets

(51) Int. Cl.
*E04C 2/30* (2006.01)
*E04F 15/04* (2006.01)
*F16B 5/00* (2006.01)
*E04C 2/00* (2006.01)

(52) U.S. Cl.
CPC ........ *E04F 15/02* (2013.01); *E04F 15/02005* (2013.01); *E04F 15/02022* (2013.01); *E04F 15/04* (2013.01); *E04C 2002/004* (2013.01); *E04F 2015/02122* (2013.01); *E04F 2201/0138* (2013.01); *E04F 2201/0146* (2013.01); *E04F 2201/0523* (2013.01); *F16B 5/008* (2013.01); *F16B 5/0056* (2013.01)

(56) References Cited

U.S. PATENT DOCUMENTS

| | | | |
|---|---|---|---|
| 6,854,235 B2 | 2/2005 | Martensson | |
| 7,451,578 B2 | 11/2008 | Hannig | |
| 7,603,826 B1 | 10/2009 | Moebus | |
| 7,621,092 B2 | 11/2009 | Groeke et al. | |
| 7,980,039 B2 | 7/2011 | Groeke et al. | |
| 7,980,043 B2 | 7/2011 | Moebus | |
| 8,024,904 B2 | 9/2011 | Hannig | |
| 8,132,384 B2 | 3/2012 | Hannig | |
| 8,615,952 B2* | 12/2013 | Engstrom | E04F 15/02038 52/489.2 |
| 8,621,814 B2* | 1/2014 | Cappelle | E04F 15/02 52/582.1 |
| 8,631,621 B2 | 1/2014 | Hannig | |
| 8,938,929 B2* | 1/2015 | Engstrom | E04F 15/02038 52/586.2 |
| 8,978,334 B2* | 3/2015 | Engstrom | E04F 15/02 52/391 |
| 2003/0180091 A1 | 9/2003 | Stridsman | |
| 2004/0068954 A1 | 4/2004 | Martensson | |
| 2004/0211143 A1 | 10/2004 | Hanning | |
| 2007/0006543 A1* | 1/2007 | Engstrom | E04F 15/02 52/582.1 |
| 2007/0028547 A1* | 2/2007 | Grafenauer | E04F 13/10 52/586.1 |
| 2007/0193178 A1 | 8/2007 | Groeke et al. | |
| 2007/0240376 A1* | 10/2007 | Engstrom | E04F 15/02005 52/588.1 |
| 2008/0010938 A1 | 1/2008 | Hannig | |
| 2008/0236088 A1* | 10/2008 | Hannig | B27M 3/0066 52/592.1 |
| 2009/0064624 A1* | 3/2009 | Sokol | E04F 15/02 52/589.1 |
| 2009/0100782 A1* | 4/2009 | Groeke | E04F 15/02 52/589.1 |
| 2009/0217615 A1* | 9/2009 | Engstrom | E04F 15/02 52/588.1 |
| 2009/0249733 A1 | 10/2009 | Moebus | |
| 2010/0043333 A1* | 2/2010 | Hannig | E04F 15/02 52/582.2 |
| 2011/0088346 A1 | 4/2011 | Hannig | |
| 2011/0167750 A1* | 7/2011 | Pervan | E04F 15/04 52/588.1 |
| 2012/0011796 A1 | 1/2012 | Hannig | |
| 2012/0055112 A1* | 3/2012 | Engstrom | E04F 15/02144 52/582.2 |
| 2012/0124932 A1* | 5/2012 | Schulte | E04F 15/02 52/588.1 |
| 2013/0008119 A1* | 1/2013 | Vermeulen | E04F 15/02038 52/588.1 |
| 2013/0025231 A1* | 1/2013 | Vermeulen | E04F 15/02038 52/588.1 |
| 2014/0366475 A1* | 12/2014 | Cappelle | E04F 15/02 52/582.1 |

FOREIGN PATENT DOCUMENTS

| | | |
|---|---|---|
| DE | 201 12 474 U1 | 12/2002 |
| DE | 299 24 454 U1 | 5/2003 |
| DE | 10 2004 055 951 A1 | 7/2005 |
| DE | 10 2004 001 363 A1 | 8/2005 |
| DE | 10 2005 002 297 A1 | 8/2005 |
| DE | 20 2007 000 310 U1 | 4/2007 |
| EP | 1 350 904 A2 | 10/2003 |
| EP | 1 282 752 B1 | 10/2004 |
| EP | 1 159 497 B1 | 9/2005 |
| EP | 1 415 056 B1 | 1/2006 |
| EP | 1 818 478 A1 | 8/2007 |
| EP | 2 034 106 A1 | 3/2009 |
| JP | H07-300979 A | 11/1995 |
| SE | 515 324 C2 | 7/2001 |
| WO | 97/47834 A1 | 12/1997 |
| WO | 2004/079130 A1 | 9/2004 |
| WO | 2005/054599 A1 | 6/2005 |
| WO | 2006/043893 A1 | 4/2006 |
| WO | 2006/104436 A1 | 10/2006 |
| WO | 2007/008139 A1 | 1/2007 |
| WO | 2007/079845 A1 | 7/2007 |
| WO | 2009/066153 A2 | 5/2009 |
| WO | 2010/082171 A2 | 7/2010 |
| WO | WO 2010082171 A2 * | 7/2010 |
| WO | 2012/049577 A2 | 4/2012 |

OTHER PUBLICATIONS

International Search Report of International Application No. PCT/IB2012/056491, mailed Feb. 25, 2014.

* cited by examiner

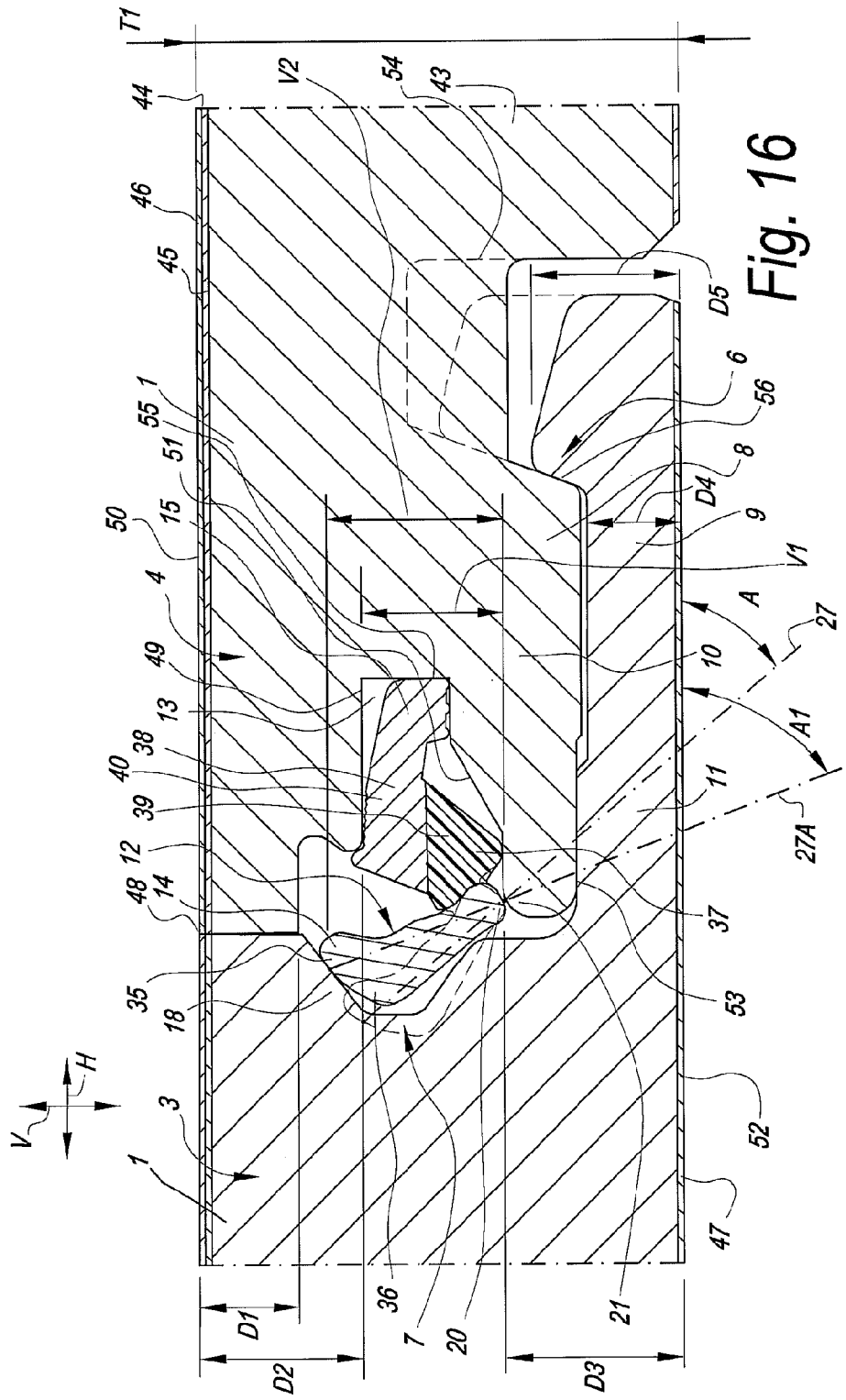

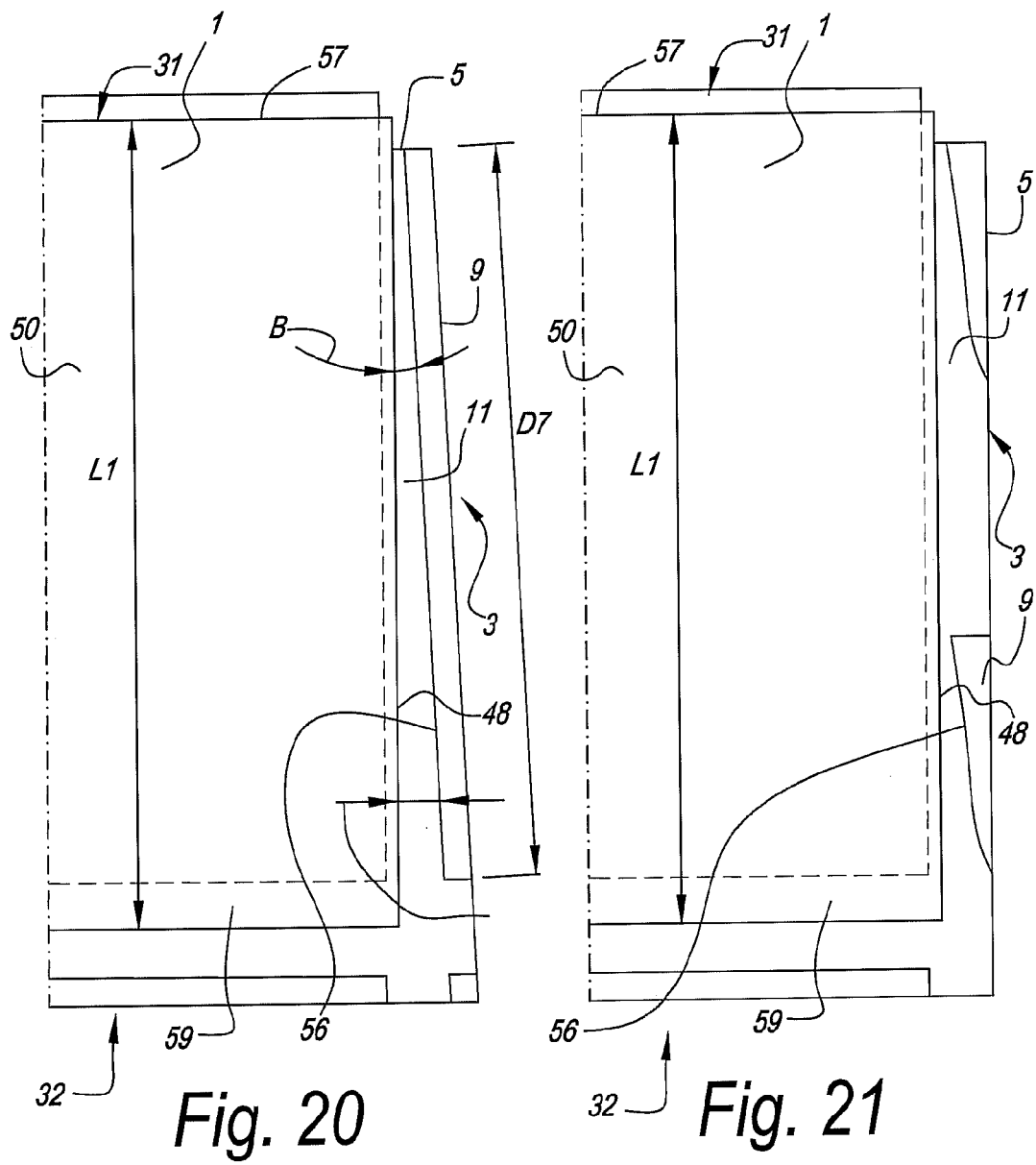

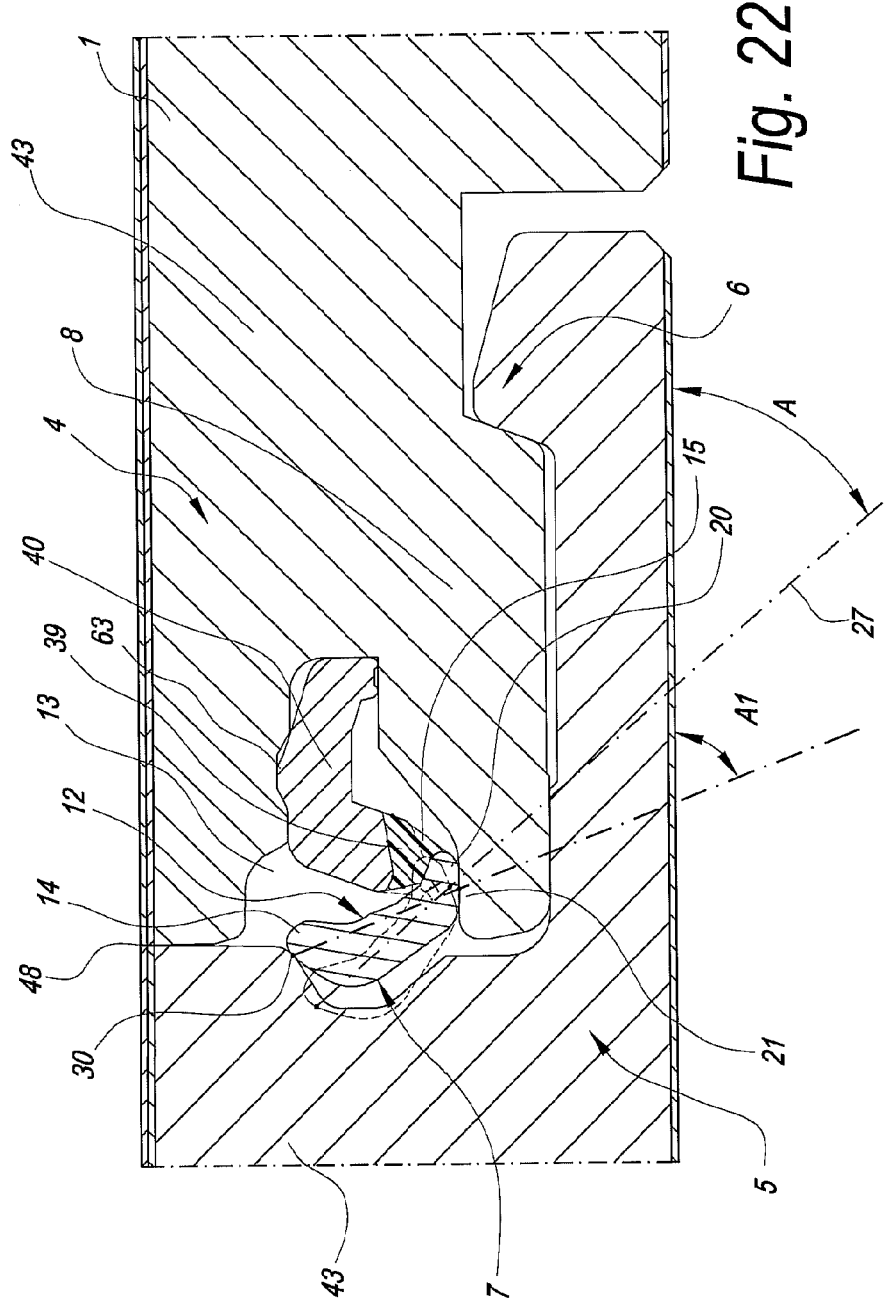

PANEL

BACKGROUND

1. Field of the Invention

This invention relates to a panel, such as, for example, to a floor panel, a ceiling panel, a wall panel or the like.

More particularly, it relates to a panel, which, at least at two opposite sides, comprises coupling parts, in the form of a male coupling part and a female coupling part, respectively, which allow that two of such panels can be connected to each other at said sides, or, in other words, can be brought in a coupled condition, by providing one of these panels with the pertaining male coupling part, by means of a downward movement, in the female coupling part of the other floor panel, such that thereby at least a locking in horizontal direction is obtained.

Couplings allowing that two panels, such as floor panels, can be coupled to each other by inserting one floor panel with a downward movement into the other, in practice are divided into two types, namely a first type, wherein the coupling parts provide exclusively for a horizontal locking, without any locking in vertical direction, and a second type, wherein a horizontal as well as vertical locking is provided.

2. Related Art

The couplings of the first type are also known as so-called "drop-in" systems. Floor panels which are provided therewith at two opposite sides are known, amongst others, from CA 991.373 and JP 07-300979. As becomes evident from these patent documents, such "drop-in" systems often are applied on a first pair of opposite sides of the floor panels only, whereas then on the second pair of opposite sides coupling parts are applied, which, in the coupled condition of two floor panels, provide for a vertical as well as for a horizontal locking and which allow that two of such floor panels can be coupled to each other by means of an angling movement. Floor panels with such a combination of coupling parts offer the advantage that they can be easily installed in rows in a successive manner, simply by coupling each newly to install floor panel to the preceding row of floor panels by means of the angling movement and by providing for, during the angling down, that such floor panel at the same time also engages in an already installed preceding floor panel of the same row. Thus, installing such floor panel requires only an angling and putting down-movement, which is a particularly user-friendly installation technique.

A disadvantage of floor panels with such coupling parts consists in that, due to the fact that there is no locking in vertical direction, height differences among the coupled floor panels may occur on the upper surface. For example, such floor panels in a first or last row of a floor covering can turn upward again from their flat position if they are not held downward by a skirting board or the like. Even if such floor panels are provided with a "drop-in" system on only one pair of sides, whereas they are locked at their other pair of sides in horizontal as well as in vertical direction in respect to adjoining floor panels, height differences among adjoining floor panels can occur at the sides which are coupled by the "drop-in" system, amongst others, when two adjoining floor panels are loaded differently, or when one floor panel should warp somewhat and bend in respect to the other.

Couplings of the aforementioned second type, also called "push-lock" systems, attempt to remedy the aforementioned disadvantage by also providing a vertical locking. Such so-called "push-lock" systems can be divided into two different categories, namely one-piece embodiments and embodiments comprising a separate locking element which is made as an insert, which either is or is not fixedly attached to the actual floor panel.

One-piece embodiments are known, amongst others, from the patent documents DE 29924454, DE 20008708, DE 20112474, DE 102004001363, DE 102004055951, EP 1.282.752 and EP 1.350.904. The known one-piece embodiments have the disadvantage that they work relatively difficult and that a good interconnection of two floor panels cannot always be guaranteed.

Embodiments comprising a separate locking element, which assists in a vertical and possibly also horizontal locking between two coupled floor panels, are known, amongst others, from the patent documents DE 202007000310, DE 102004001363, DE 102005002297, EP 1.159.497, EP 1.415.056 B1, EP 1.818.478, WO 2004/079130, WO 2005/054599, WO 2006/043893, WO 2006/104436, WO 2007/008139, WO 2007/079845, WO 2009/066153, WO 2010/082171 and SE 515324. The use of a separate locking element offers the advantage that the material thereof is independent from the actual floor panel and thus can be chosen optimally in function of the application. In this manner, such inserts can be realized from synthetic material or metal, by which relatively strong, however, still easily movable locking portions can be realized, which can take up relatively large forces with a minimum contact surface.

SUMMARY

The present invention relates to floor panels which are equipped with a "push-lock" system of the latter category, in other words, which comprise a, whether or not fixedly attached, however, separately realized insert. The aim of the invention consists in a further optimization of these "push-lock" systems in floor panels.

The invention relates to panels, and in particular to floor panels, which are of the specific type:

which, at least at two opposite sides, comprises coupling parts by which two of such floor panels can be coupled to each other;

wherein these coupling parts form a horizontally active locking system and a vertically active locking system;

wherein the horizontally active locking system comprises a male part and a female part, which allow that two of such floor panels can be coupled to each other at the aforementioned sides by providing one of these floor panels with the pertaining male part, by means of a downward movement, in the female part of the other floor panel;

wherein the vertically active locking system comprises a locking element, which, in the form of an insert, is provided in one of the respective sides;

wherein this locking element comprises at least a lock-up body, preferably a pivotable lock-up body; and wherein the lock-up body, at one extremity, forms a stop-forming locking portion, which can cooperate with a locking portion of a similar coupled floor panel.

Floor panels of this type are known, amongst others, from the FIGS. 5-7, 8 and 9-11 of the aforementioned EP 1.415.056 B1. In these known embodiments, the locking portion, made in the form of an insert, consists of a synthetic material strip with an elastically bendable lip, which, when being bent, functions as a pivotable lock-up body. These known embodiments show the advantage that with a relatively simple construction a so-called "push-lock" connection can be realized which is active over the entire length of the synthetic material strip. However, practice has shown that this known embodiment is not always smoothly operable and that tolerances in a realized coupling sometimes are difficult to keep under control.

Floor panels of this type are also known from WO 2010/082171 and WO 2009/066153, wherein the pivotable lock-up body, in these cases, opposite to the extremity forming the locking portion, comprises a support portion which can be rotated against a support surface pertaining to the respective panel, and more particularly in a seat. As the lock-up body is provided with a support portion which can be rotated against a support surface, and more particularly can be rotated in a seat, the pivoting movement of the lock-up body is better defined than in the embodiments of said EP 1.415.056 B1. In these embodiments, the pivotable lock-up body namely is made as a prolongation of an attachment portion, by which the hinge effect takes place in the material of the insert and the precise pivoting movement is difficult to predict, which may lead to less adequate working. The coupling parts disclosed in WO 2010/082171 and WO 1009/066153, however, entail difficulties when having to be integrated in specific panels. For example, it is difficult to apply the coupling parts in panels with limited thickness, for example, in panels having a thickness of 12 millimeters or less, and/or in laminate panels. Also, difficulties are experienced when it is desired to restrict the dimensions of the lock-up body, either as a result of lack of space in thin panels or as a result of striving for a more economical insert.

Primarily, the present invention aims at alternative panels of the aforementioned specific type, which, according to various preferred embodiments thereof, are improved further in respect to the aforementioned known embodiments, wherein those improvements, for example, allow integrating a push-lock system of the above-mentioned type into panels with a lesser thickness.

To this aim, the invention, according to a first aspect, relates to a panel, which, at least at two opposite sides, comprises coupling parts with which two of such panels can be brought in a coupled condition; wherein these coupling parts form a horizontally active locking system and a vertically active locking system; wherein the horizontally active locking system comprises a male part and a female part allowing that two of such panels, at said sides, can be connected to each other by providing one of these panels with the pertaining male coupling part by means of a downward movement in the female coupling part of the other floor panel; wherein the vertically active locking system comprises a locking element, which, in the form of an insert, is provided in one of the respective sides; wherein this locking element comprises at least a pivotable lock-up body; and wherein the lock-up body, at one extremity, forms a stop-forming locking portion, which can cooperate with a locking portion of a similar coupled panel, with the characteristic that said pivotable lock-up body, when the insert is provided in the recess, however, in the non-coupled condition, adopts an orientation which forms an angle of less than 60°, less than 50° or still better of less than 45° or of approximately 40° with the panel surface. Herein, the orientation of the lock-up body, when the insert is provided in the recess, however, in the non-coupled condition, is determined by a line which, on the one hand, passes through the tangent point of the horizontal tangent through the support portion and, on the other hand, passes through the center point of the stop-forming locking portion. Herein, it is noted that the position of this center point is determined in coupled condition, whereas said line through this point and the orientation related thereto as such is determined in the non-coupled condition.

The, according to this first aspect, relatively flat orientation of the pivotable lock-up body entails new possibilities and is of particular interest for the design of compact locking systems. So, for example, it is possible with an orientation which deviates from the panel surface only to a limited extent, to apply a lock-up body which is relatively long compared to the thickness of the panel. The orientation of less than 60° or less than 50° results in a more gradual locking during the downward movement.

When the insert is provided in the male part and shows an upward-directed lock-up body, this lock-up body preferably, in the non-coupled condition, further comprises a surface which, when performing said downward movement, comes into contact with the upper edge of the other panel, wherein this surface, when said contact is made, has a tangent line which forms an angle of 20° to 45° with the upper surface of the panels. Such feature promotes a smooth coupling of two of such panels at the respective sides, also in the case when the upper edge at these sides is made straight, namely without chamfers or other deepened edges. Achieving a smooth coupling is particularly interesting with panels which comprise a decorative top layer comprising melamine or other thermo-hardening or other brittle transparent layers, such as layers on the basis of UV-hardened or electron beam-hardened lacquer. In such panels, having to tap on the panels for coupling them to each other best is avoided.

Preferably, the pivotable lock-up body, opposite to the extremity which forms the locking portion, comprises a support portion which is rotatable against a support surface pertaining to the respective panel, and more particularly in a seat.

Preferably, the panel of the invention has a thickness of 12 millimeters or less, or still better a thickness of 9.5 or 8 millimeters or less. Preferably, the thickness, however, is more than 6 millimeters. Of course, it is not excluded that the invention should be applied with thicker panels, such as with panels having a thickness of 12 millimeters to 18 millimeters. Preferably, in such cases so-called engineered wood panels or panels for prefabricated parquet are concerned.

Preferably, the length of the lock-up body, this is the shortest distance between the locking portion and the support portion, is more than 30 percent of the thickness of the panel, or still better more than 35 percent of the thickness of the panel.

Preferably, the panel of the invention relates to a panel which substantially is composed of a core material and a decorative top layer. Possibly, a backing layer can be applied on the side of the core material opposite to the top layer. According to the most preferred embodiment, for the core material a wood-based board material, such as MDF or HDF (Medium Density Fiberboard or High Density Fiberboard) is applied. Preferably, the decorative top layer substantially consists of synthetic material and/or paper, wherein the decorative top layer preferably comprises a printed motif. Such panels can be composed according to various possibilities. Below, some possibilities will be described in more detail.

According to a first possibility, the panel relates to a laminate panel of the type DPL or HPL (Direct Pressure Laminate or High Pressure Laminate), wherein for the decorative top layer use is made at least of a printed or colored paper layer on which a transparent layer of melamine resin is situated. Possibly, this melamine resin as such can also include a transparent paper layer and/or hard particles. According to this first possibility, preferably a core material is used which consists of HDF or MDF, and on the underside of the core material preferably a backing layer comprising a paper layer and melamine resin is applied. Such backing layer offers a balancing effect for possible residual tensions which can be present in the top layer. According to the DPL principle, the composing layers and the core material of such panel are solidified and adhered to each other in one pressing step. According to the HPL principle, the composing layers of the top layer of such panel are solidified prior to being adhered to the core material in a subsequent step.

According to a second possibility, the panel relates to a directly printed laminate panel, wherein the decorative top layer is formed at least by performing a print on the core material, whether or not by the intermediary of one or more primer layers, for example, by means of offset printing or a digital printing process, such as inkjet printing. In order to obtain a certain wear resistance, such print can be finished further with one or more transparent lacquer layers or melamine layers, such as with one or more UV-hardened or electron beam-hardened lacquer layers. Such transparent layers further may also comprise hard particles. According to this second possibility, preferably a core material is used which consists of HDF or MDF, and at the underside of the core material preferably a backing layer is applied, which preferably provides for a vapor-tight barrier, for example, by means of a lacquer. According to this second possibility, a panel can be offered which is free from paper layers in the top layer and possibly in the backing layer, too.

Preferably, the decorative top layer is realized with a thickness which is smaller than 1 millimeter or even smaller than 0.5 or 0.3 millimeters. This is usually the case with the panels of the above first and second possibility. It is in particular with such panels that the invention shows its advantages. Namely, by means of the particular lock-up body of the invention a better vertically active locking system can be obtained. More particularly, a coupled condition can be achieved in which there are no or almost no height differences between the adjacent upper edges of the coupled panels. In any case, a possible height difference preferably is restricted to a maximum of 0.2 millimeters or even of 0.1 millimeter or less, such that the core material remains hidden. Minimizing height differences is particularly interesting with such thin top layers, as they, during use, can wear down relatively fast as a result of repeated impact on excessively protruding upper edges. In particular with decorative top layers which comprise melamine or other thermo-hardening or other brittle transparent layers, such as with layers on the basis of UV-hardened or electron beam-hardened lacquer, avoiding excessive height differences is relevant.

Preferably, two coupled-together panels of the invention do show, at the edge comprising the inventive locking system of the invention, a decorative surface formed by a color pattern and/or a structure, wherein this color pattern and/or this structure extends at least partially continuously from the one panel to the other panel. The locking systems of the invention allow such qualitative coupling of the edge that also the adjacent coupled panel edges will not or hardly interfere with the color pattern and/or the structure. According to a particular example thereof, the color pattern and the structure relates to an imitation of a cement joint or other joint. When coupling the respective edges, the illusion is created of a one-piece joint extending between the coupled panels. According to another example, which may or may not be combined with the preceding, the imitation of a tile, natural stone or wood part is concerned. When coupling the respective edges, the illusion is created of a one-piece tile, stone or wood part, which extends between the coupled panels. According to a combination of both examples, the illusion of one-piece joints and, for example, tiles can be obtained, which extend between the coupled panels.

It is noted that at the coupled edges possibly a chamfer or other bevel can be provided according to any technique.

Preferably, said pivotable lock-up body, in coupled condition, adopts an orientation in which this lock-up body forms an angle with the panel surface which is larger than the angle formed in the non-coupled condition. Preferably, the difference between both angles is at least 5° or even more than 10°. In this manner, a tensioning effect is obtained between the locking portion of the lock-up body and the locking portion of the coupled-thereto panel with which the lock-up body works in conjunction.

Preferably, said pivotable lock-up body, in coupled condition, adopts an orientation in which this lock-up body forms an angle with the panel surface of less than 90°, however, more than 50°.

Preferably, the lock-up body, between the locking portion and the support portion, as such is free from hinge portions and bending sections. As the lock-up body is free from hinge portions and bending sections, possible influences thereof on the shape and length of the lock-up body are excluded, and a fixed usable length of the lock-up body can be guaranteed, such that, amongst others, small production tolerances can be maintained, which allow precise couplings without height differences or almost without height differences. In connection therewith, it is also preferred that the lock-up body is realized as a rigid element. Preferably, the lock-up body substantially consists of hard PVC or another hard synthetic material. In the case of PVC, preferably so-called stabilized PVC is used, or still better PVC comprising Ca/Zn stabilisators. Such stabilized synthetic material offers a stable lock-up body, even in extreme climatic circumstances.

Preferably, the pivotable lock-up body, opposite to the extremity forming the locking portion, comprises a support portion in the form of a whether or not free extremity which, at least in vertical direction, is positively supported by a support portion pertaining to the panel or floor panel.

In the cases in which the support portion is made as a free extremity, it will not be subjected to any influences of adjacent material portions in its support portion, which is beneficial for an easy hinge movement of the lock-up body. Substantially, by a free extremity it is meant that this is simply made as a protruding leg with no further parts appended.

In the cases wherein the support portion is made in another manner than as a free extremity, a press-on effect can be obtained with an adjacent material part, which may result in a more stable coupling.

Preferably, the lock-up body is rotatable around a pivot point, support point, respectively, and the locking element comprises a press-on portion which engages laterally on the lock-up body. Hereby, with the press-on element an appropriate force can be exerted against the pivotable lock-up body. Preferably, an elastic synthetic material, such as polyurethane, is applied for the press-on element.

As aforementioned, the lock-up body preferably comprises a press-on portion which effects laterally on the lock-up body. Preferably, the press-on portion shows one or more of the following features:

that it consists of an elastic material;
    that it consists of an elastic material which, as such, is more flexible than the material of the lock-up body, which preferably is realized, by means of coextrusion, in one piece with the lock-up body;
    that it consists of a foldable or bendable portion;
    that it is provided with an attachment portion;

that it is provided with an attachment portion in the form of a clamped part;

that it is provided with a portion with which it is glued to the panel;

that, seen in cross-section, it consists of an elastically bendable leg;

that it is provided with one or more elastic bending zones, which either form a connection between the actual press-on portion and the lock-up body, or a connection between several portions of the press-on portion.

Preferably, the vertically active locking system comprises a tensioning system which is formed by a cam surface formed on the extremity of the locking portion of the lock-up body, which cam surface, in coupled condition, provides for a wedge effect against the opposite locking portion of the coupled floor panel. By such configuration, the lock-up body, in coupled condition, will always settle well under or on the locking portion of the other floor panel. By small movements which occur when the floor panels are being walked on, the lock-up body, due to the wedge effect, will creep further under or onto the locking portion of the other floor panel, which will result in an even firmer coupling.

According to a particular preferred embodiment of the first aspect, the locking element consists of a strip which is attached in a recess in the panel. Herein, preferably, attachment provisions are present which retain the strip in the recess. Such attachment provisions can be formed, for example, on said press-on portion, to which aim the press-on portion preferably is provided with an attachment portion in the form of a clamped part. Preferably, said lock-up body, in the coupled condition of two of such panels, extends over a vertical distance which is smaller than 1.4 times, or still better is smaller than 1.3 times, the vertical distance defined by said attachment provisions or said recess. Preferably, the vertical distance defined by said attachment provisions or said recess is smaller than half of the thickness of the respective panel, or smaller than half of the thickness of the possible core material thereof, or even, still better, smaller than one third of the thickness. In the case of a clamped part of the strip, said vertical distance is determined by the largest vertical distance between the clamping surfaces on the opposite sides of the strip.

It is clear that the above preferences as such result in a compact locking system, which, for example, is highly suitable for being applied in relatively thin panels or in panels with thin top layers. In particular, such system is suitable for being applied in panels having a thickness of 12 millimeters or less, or still better a thickness of 9.5 or 8 millimeters or less, and/or in panels which substantially are composed of a core material and a decorative top layer, such as those mentioned within the scope of the first aspect.

Therefore, it is clear that the invention, according to a second aspect, in an independent manner relates to a panel which, at least at two opposite sides, comprises coupling parts with which two of such panels can be brought in a coupled condition; wherein these coupling parts form a horizontally active locking system and a vertically active locking system; wherein the horizontally active locking system comprises a male part and a female part, which allow that two of such panels can be connected to each other at said sides by providing one of these panels with the pertaining male part, by means of a downward movement, in the female part of the other panel; wherein the vertically active locking system comprises a locking element, which, in the form of an insert, is provided in one of the respective sides; wherein this locking element comprises at least one downward-directed lock-up body; and wherein the lock-up body, on the downward-directed extremity thereof, forms a stop-forming locking portion, which can cooperate with a locking portion of a similar coupled panel, wherein the locking element consists of a strip which is attached in a recess in the panel, and that herein attachment provisions are present which retain the strip in the recess, wherein said attachment provisions are connected via a hinge portion to said lock-up body, characterized in that said lock-up body, in the coupled condition of two of such panels, extends over a vertical distance which is smaller than 1.4 times the vertical distance defined by said attachment provisions. Preferably, this relates to a pivotable lock-up body. Preferably, said vertical distance defined by said lock-up body is larger than or equal to the vertical distance defined by said attachment provisions.

Preferably, the attachment provisions are formed at least on a press-on portion of the strip, to which aim this press-on portion preferably is provided with an attachment portion in the form of a part clamped, for example, in the recess. In such case, said vertical distance is determined by the largest vertical distance between the clamping surfaces on opposite sides of the strip.

It is clear that the panel of the first aspect further also may show the characteristics of the first aspect of the invention and/or the preferred embodiments thereof.

According to a third independent aspect, the invention also relates to a panel which, at least at two opposite sides, comprises coupling parts with which two of such panels can be coupled to each other; wherein these coupling parts form a horizontally active locking system and a vertically active locking system; wherein the horizontally active locking system comprises a male part and a female part, which allow that two of such panels can be connected to each other at said sides by providing one of these panels with the pertaining male part, by means of a downward movement, in the female part of the other panel; and wherein the vertically active locking system comprises a locking element, which, in the form of an insert, is provided in one of the respective sides; with the characteristic that the locking element consists of a coextruded synthetic material strip provided in a recess, which strip, seen in cross-section, is composed of two or more zones consisting of synthetic materials with different features, wherein at least one of these synthetic materials relates to stabilized PVC (Polyvinyl chloride).

The use of such coextruded synthetic material strip offers the advantage that the features can be chosen depending on the function which certain components of such strip have to exert. Stabilized polyvinyl chloride is ideally suitable for forming a rigid portion of the locking element, such as, for example, a lock-up body as described by means of the first aspect or the preferred embodiments thereof.

Within the scope of the third aspect, certain components, which have to exert a pressing force or tensioning force, can be realized in a rather elastic synthetic material, whereas components which have to take up forces in an immovable status then better consist of a hard synthetic material. Thus, preferably use is made of synthetic materials having a different suppleness, elasticity, respectively. Also, supple synthetic materials can be applied for realizing movable connections between different components of the strip.

It is clear that the third aspect extends to all "push-lock" systems which use a separate locking element which is or will be provided in a recess in the edge of a floor panel, and is not restricted exclusively to locking elements with a pivotable lock-up body.

It is noted that the third aspect can be applied in a very advantageous manner in combination with the first aspect and/or the second aspect and/or the preferred embodiments thereof.

With the same aim as in the preceding aspects, the present invention, according to a fourth independent aspect, also relates to a panel, which, at least at two opposite sides, comprises coupling parts with which two of such panels can be brought in a coupled condition; wherein these coupling parts form a horizontally active locking system and a vertically active locking system; wherein the horizontally active locking system comprises a male part and a female part, which allow that two of such panels can be connected to each other at said sides by providing one of these panels with the pertaining male part, by means of a downward movement, in the female part of the other panel; wherein the vertically active locking system comprises a locking element, which, in the form of an insert, is provided in one of the respective sides; wherein this locking element comprises at least a pivotable lock-up body; and wherein the lock-up body, at one extremity, forms a stop-forming locking portion, which can cooperate with a locking portion of a similar coupled panel, wherein the locking element consists of a strip which is attached in a recess in the panel, and that herein an attachment portion is present which retains the strip in the recess, with the characteristic that said pivotable lock-up body and the attachment portion, in the non-coupled condition, extend at least for a part in horizontal direction underneath each other, however, herein maintain a vertical distance between each other. It is noted that herein, said vertical distance does not have to be constant and preferably even varies in said horizontal direction. Herein, the vertical distance preferably increases from the lock-up body towards the attachment portion.

Preferably, said pivotable lock-up body and the attachment portion, during the major part of the downward coupling movement or during the entire coupling movement, partially extend in horizontal direction underneath each other. During the coupling movement, vertical forces exerted on the lock-up body can be absorbed better, which can be advantageous for the stability of the coupling.

Preferably, the extent to which said pivotable lock-up body and the attachment portion extend underneath each other is larger in coupled condition than in non-coupled condition.

Preferably, the smallest vertical distance between the respective portions of the lock-up body and the attachment portion, which extend underneath each other, is less than 0.4 millimeters or even less than 0.2 millimeters.

Preferably, the locking element comprises an elastic bending zone forming a connection between the attachment portion and the pivotable lock-up body. Preferably, said bending zone extends at least between the respective portions of the lock-up body and the attachment portion which extend underneath each other. According to a practical realization of such bending zones, the locking element consists of a coextruded synthetic material strip with, seen in cross-section, a plurality of zones of synthetic material with different characteristics, namely, on the one hand, at least a first zone formed by said lock-up body and, on the other hand, at least a second zone formed by said elastic bending zone. Said attachment portion preferably forms a third zone, which preferably consists of a similar synthetic material as said first zone of the lock-up body.

Preferably, the material of the elastic bending zone is free from contact with the remaining material of the panel and thus preferably only engages at surfaces of the lock-up body and the attachment portion.

Preferably, said pivotable lock-up body, in the non-coupled condition, however, provided in the recess, adopts an orientation which forms an angle of less than 60° with the panel surface.

Preferably, said lock-up body, in the coupled condition of two of such panels, extends over a vertical distance which is smaller than 1.4 times the vertical distance defined by said attachment provisions.

According to an important embodiment, said locking element is provided in said male part, wherein said pivotable lock-up body is directed upward. With such embodiment, a smooth coupling movement is critical. In fact, when performing the downward movement, the lock-up body is pressed inward by means of a contact with the upper edge of the other panel. Such upper edge forms a far from ideal guide surface for the lock-up body, certainly in the cases where a straight upper edge is used, but also in the cases where a chamfer or other deepened edge is provided at this upper edge. This contact with the upper edge of the other panel can result in that the locking element is pushed upward, and the locking element can be pulled out of its position in such a manner that the coupling becomes impossible. As now, according to the fourth aspect, said pivotable lock-up body and the attachment portion, in the non-coupled condition, extend at least for a part in horizontal direction underneath each other, however, maintain a vertical distance between each other herein, it is obtained that the lock-up body is better supported by means of the attachment portion.

According to the above important embodiment, it is namely preferably said pivotable lock-up body which, in the coupled condition, extends at least for a part in horizontal direction underneath the attachment portion. In this manner, it is obtained that any pushing-upward of the lock-up body can be counteracted by the attachment portion.

Also according to the above important embodiment, the pivotable lock-up body, in the non-coupled condition, however, provided in the recess, comprises a surface which, when performing said downward movement, comes into contact with the upper edge of the other panel, wherein this surface, when this contact is effected, has a tangent line which forms an angle of 20 to 45° with the upper surface of the panels. This measure promotes a smooth mounting of the panels.

Preferably, the lock-up body, opposite from the part forming the locking portion, has a support portion which can be rotated against a support surface pertaining to the respective floor panel. Preferably, said portions extend underneath each other over a horizontal distance which is at least thirty percent, or still better at least half of the horizontal distance over which said support surface is extending.

Preferably, said support surface, at least in coupled condition, extends in horizontal direction at least partially underneath said elastic bending zone and underneath said attachment portion. In this manner, an extremely stable coupling can be obtained. Preferably, said support surface, also in the non-coupled condition, however, provided in the recess, extends in horizontal direction at least partially up to vertically underneath said elastic bending zone and underneath said attachment portion.

With the same aim as in preceding aspects, the present invention, according to a fifth independent aspect, also relates to a panel which, at least at two opposite sides, comprises coupling parts with which two of such panels can be brought in a coupled condition; wherein these coupling parts form a horizontally active locking system and a vertically active locking system; wherein the horizontally active locking system comprises a male part and a female part, which allow that two of such panels can be connected to each other at said sides by providing one of these panels with the pertaining male part, by means of a downward movement, in the female part of the other panel; wherein the vertically active locking system comprises a locking element, which, in the form of an insert, is provided in one of the respective sides; wherein this locking element comprises at least a pivotable lock-up body; and wherein the lock-up body, at one extremity, forms a stop-forming locking portion, which can cooperate with a locking portion of a similar coupled panel, wherein the locking element consists of a strip which is attached in a recess in the panel, and that herein an attachment portion is present which retains the strip in the recess, wherein the locking element comprises an elastic bending zone, which forms a connection between the attachment portion and the pivotable lock-up body and wherein the lock-up body, opposite to the part forming the locking portion, comprises a support portion which can be rotated against a support surface pertaining to the respective floor panel, with the characteristic that, in the coupled condition of two of such panels, said support surface, in horizontal direction, extends at least for a part vertically underneath said elastic bending zone and underneath said attachment portion. It is clear that this fifth aspect can also show the characteristics of the preferred embodiments of the preceding fourth aspect, independently from the fact whether a vertical distance is maintained between the lock-up body and the attachment portion.

Various further independent aspects and advantageous subordinate characteristics of all aspects will be described further by means of the embodiments represented in the figures. All these subordinate characteristics do not necessarily have to be applied in the mutual combinations as are shown in the figures. Each characteristic can be combined as such with the first, the second and/or the third independent aspect, such insofar as such subordinate characteristic is not contradictory to the characteristics of the respective independent aspect itself.

It is noted that the present invention preferably is applied in embodiments wherein the locking element, which is made as an insert, serves substantially, and still better exclusively, as a locking element assisting in the vertical locking and thus not in the horizontal locking. The horizontal locking preferably is performed exclusively by parts, such as the aforementioned male part and female part, which are realized from the actual panel material, more particularly are formed therefrom by machining. More particularly, the invention preferably relates to embodiments wherein the insert is produced separately and then is mounted in an edge of an actual floor panel, whether or not in a fixed manner.

Further, it is noted that the locking systems of the invention are of particular interest for being applied in panels having a usable panel surface of more than 0.4 or more than 0.45 square meters. According to a particular possibility, this relates to panels having a usable panel surface of approximately half a square meter. Herein, this may relate to oblong panels with a length of more than 2 meters and a width of approximately 20 centimeters or more, or to oblong panels with a width of 40 centimeters or more and a length of 1 meter or more, or to square panels with a side of 60 centimeters or more. By means of the locking systems of the invention, a particularly handy installation can be obtained for these large panels which are more difficult to handle.

It is clear that the characteristics of the first through the fifth aspect and the preferred embodiments thereof can be combined at choice, as far as they are not contradictory.

BRIEF DESCRIPTION OF THE DRAWINGS

With the intention of better showing the characteristics of the invention, hereafter, as an example without any limitative character, some preferred embodiments are described, with reference to the accompanying figures, wherein:

FIG. 16 represents a view similar to that of FIG. 3 for a variant and at a larger scale;

FIG. 20, at a larger scale, represents a view on the area indicated by F20 in FIG. 18, however, for a variant;

FIG. 21, in a similar view, represents another variant; and

FIG. 22, in a view similar to that of FIG. 16, represents another variant;

DETAILED DESCRIPTION OF VARIOUS EMBODIMENTS

As represented in FIGS. 1 to 5, the invention relates to a floor panel 1, which, at least at two opposite sides 2-3, comprises coupling parts 4-5 with which two of such floor panels 1 can be coupled to each other.

Figure 3:
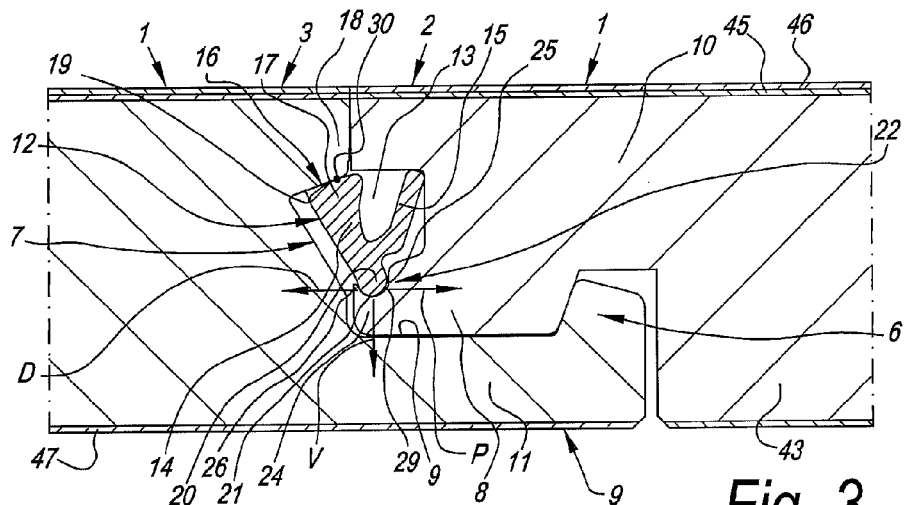
FIG. 3 in cross-section represents two floor panels, which are made according to FIG. 2, in coupled condition.

As becomes clear from the coupled condition of FIG. 3, these coupling parts 4-5 comprise a horizontally active locking system 6 and a vertically active locking system 7. The horizontally active locking system 6 comprises a male part 8 and a female part 9, which allow that two of such floor panels 1 can be connected to each other at said sides 2-3 by providing one of these floor panels 1 with the pertaining male part 8, by means of a downward movement M, in the female part 9 of the other floor panel, which movement M is illustrated by means of two different positions in FIGS. 4 and 5.

The male part 8 is formed by a downward-directed extremity of a hook-shaped part 10, whereas the female part 9 consists of a seat formed by means of an upward-directed hook-shaped part 11.

The vertically active locking system 7 comprises a locking element 12, which, in the form of an insert, is provided in one of the respective sides, in this case the side 2, more particularly in a recess 13 provided for this purpose. For clarity's sake, the locking element 12, or, in other words, thus, the insert, is depicted in separate condition in FIG. 6. As can be seen in this figure, this locking element 12 preferably is made as a strip. It is clear that this strip preferably extends over the entire or approximately entire length of the side 2, for example, at least 85 percent thereof. According to another possibility, a plurality of separate strips can bridge over the entire or approximately the entire length of the side 2. Preferably, a strip is present at least centrally on the length of this side 2.

Preferably, this strip consists of synthetic material, however, it is not excluded to use other materials for this purpose. Further, it is preferred that the strip has a continuous cross-section over its entire length, resulting in that it can be manufactured and/or mounted in a simple manner. Such strip can be produced, for example, by an extrusion technique and can be shortened to the desired length. Thus, the same continuous strip can be used for panels of different dimensions, for example, can each time be shortened to the dimension of the respective side on which the strip has to be provided. In the case of a synthetic material strip, preferably use is made of PVC, such as, for example, stabilized hard PVC.

Figure 6:
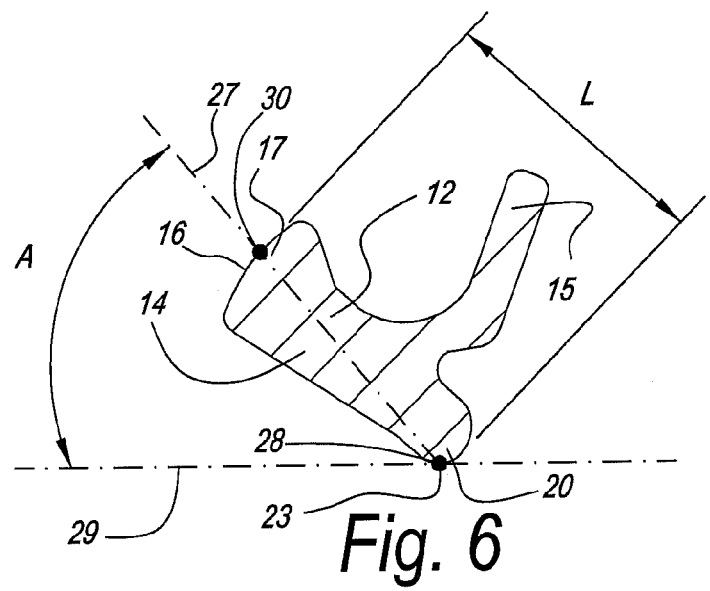
FIG. 6, at a larger scale, represents the locking element applied in the embodiment of FIGS. 2 to 5.

In the represented example, the locking element 12 is at least composed of a pivotable lock-up body 14 and a press-on portion 15. In the embodiment of FIG. 6, the lock-up body 14 consists of the entire upright part, whereas the press-on portion 15 is formed by the part directed away in an inclined manner.

Figure 4:
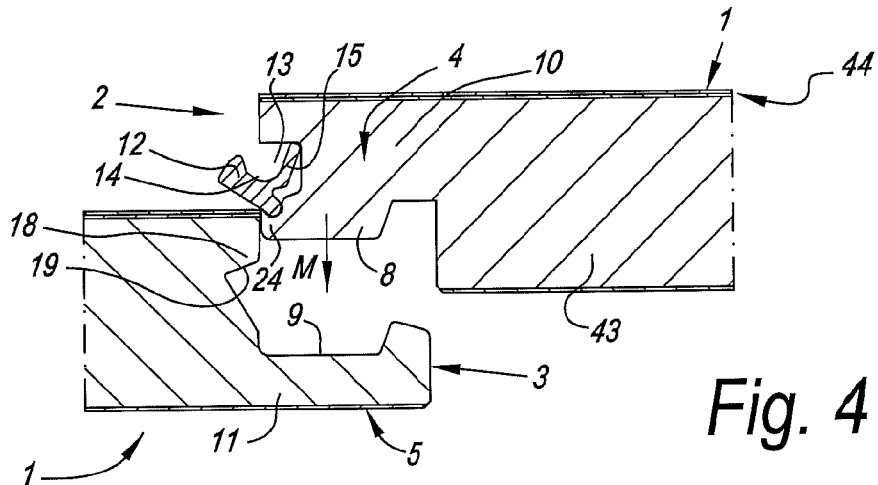
FIGS. 4 and 5 represent the floor panels from FIG. 3 in two different steps during joining.
Figure 5:
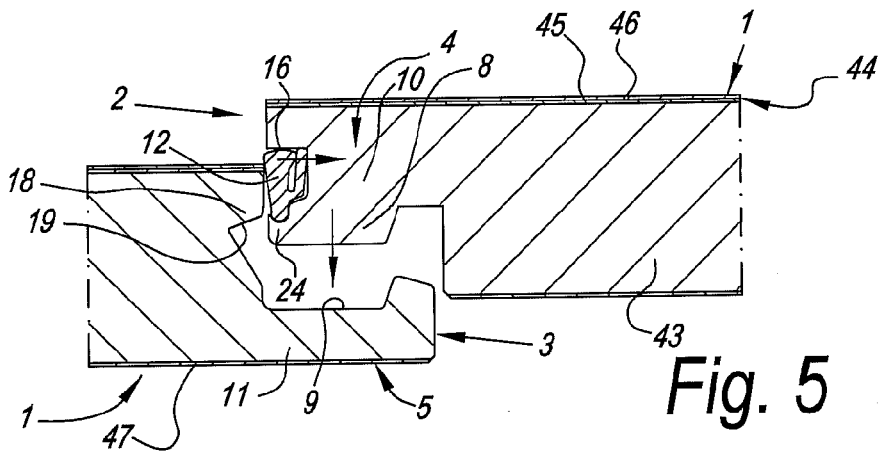

The extremity 16, which can be rotated out, of the lock-up body 14 functions as a stop-forming locking portion 17, which can work in conjunction with a locking portion 18 of a similar coupled floor panel 1. Herein, the locking portion 18 preferably is formed by a portion which defines a stop-forming surface 19 which is present in the side 3 for this purpose and preferably is realized in the core of the floor panel 1 by machining. The working of the vertically active locking system is simple to deduce from the figures and is based on the principle that, as represented in FIGS. 4 and 5, when the respective floor panel is put down, the lock-up body 14 is folded-in elastically by the contact with the edge of the other floor panel, after which, once the floor panels have arrived in the same plane, the lock-up element pivots back outward in order to become placed under the locking portion 18, such that the coupled condition of FIG. 3 is created.

In the example, the pivotable lock-up body 14, opposite to the extremity 16 forming the locking portion 17, forms a support portion 20 which can be rotated against a support surface 21, and more particularly in a seat 22, pertaining to the respective floor panel 1. In the embodiment of FIGS. 2 to 6, by the support portion 20 thus the extremity 23 opposite to the locking portion 17 is meant, in this case the lowermost extremity, of the lock-up body 14.

Further, the lock-up body 14, in the example, between the locking portion 17 and the support portion 20, in other words, between its extremities 16 and 23, as such is free from hinge portions and bending sections. To this aim, the lock-up body 14 thus is made relatively thick and preferably forms a rigid body, by which is meant that the lock-up body 14 cannot undergo any noticeable deformations between its extremities when pressures that usually can occur with "push-lock" couplings are exerted thereon.

Further, in the represented embodiment the support portion 20 is realized as a free extremity, which at least in vertical direction is positively supported by a support portion 24, more particularly support surface 21, pertaining to the floor panel 1.

As clearly seen in FIG. 3, the support portion 20 of the lock-up body 14 preferably is supported even in two directions, at least in a coupled condition of two floor panels 1, namely in vertical direction V, thus, in this case downward, as well as in proximal direction P in respect to the floor panel 1, this latter by means of the sidewall 25 of the seat 22.

In the represented example of FIGS. 1 to 5, the floor panel 1 also comprises a stop-forming part 26, which, in a distal direction D in respect to the floor panel 1, forms a blockade for the support portion 20 or, thus, for the extremity 23 of the lock-up body 14. Consequently, an adequate seat 22 can be formed by which the support portion 20 is enclosed on three sides. In this manner, the seat can function as a rather precisely defined hinge point.

Generally, it can be stated that the locking element 12 preferably consists of a strip which is attached in a recess, in the represented example thus the recess 13, in the floor panel 1 and that herein attachment provisions are present which retain the strip in the recess. More particularly, it is preferred that the strip is locked in place in the recess and/or is enclosed therein due to the design, which principle has also been applied in the embodiment of FIGS. 1 to 5.

It is noted that other techniques for attaching or retaining such strip in the recess are possible, for example, by gluing, clamping or the like. A number of examples will be described below.

FIG. 6 clearly illustrates that the floor panel of the example shows the characteristics of the first aspect in that the lock-up body 14, in the non-coupled condition, adopts an orientation which forms an angle A with the panel surface of less than 50°. As represented here, said orientation is determined by a line 27 which, on the one hand, passes through the tangent point 28 of the horizontal tangent line 29 through the support portion 20, and, on the other hand, passes through the center point 30 of the stop-forming locking portion 17. Herein, it is noted that the position of this center point 30 is determined in coupled condition, for example, in the condition as represented in FIG. 3, whereas said line 27 through this point 30 and the tangent point 28 and the corresponding orientation and angle A as such is determined in the non-coupled condition.

In the case of rectangular floor panels, whether oblong or square, it is clear that coupling parts can also be provided on the second pair of opposite sides 31-32, which coupling parts, in coupled condition, preferably provide for a horizontal as well as vertical locking. These coupling parts at the second pair of sides can also be realized as a "push-lock" coupling, whether or not in accordance with the present invention. Preferably, however, at the second pair of sides 31-32 coupling parts will be applied which allow for a mutual coupling by means of an angling movement W between two floor panels 1 to be coupled and/or by means of a shifting movement which results in a snap connection. Such coupling parts are widely known from the state of the art and are described, for example, in WO 97/47834.

Figure 7:
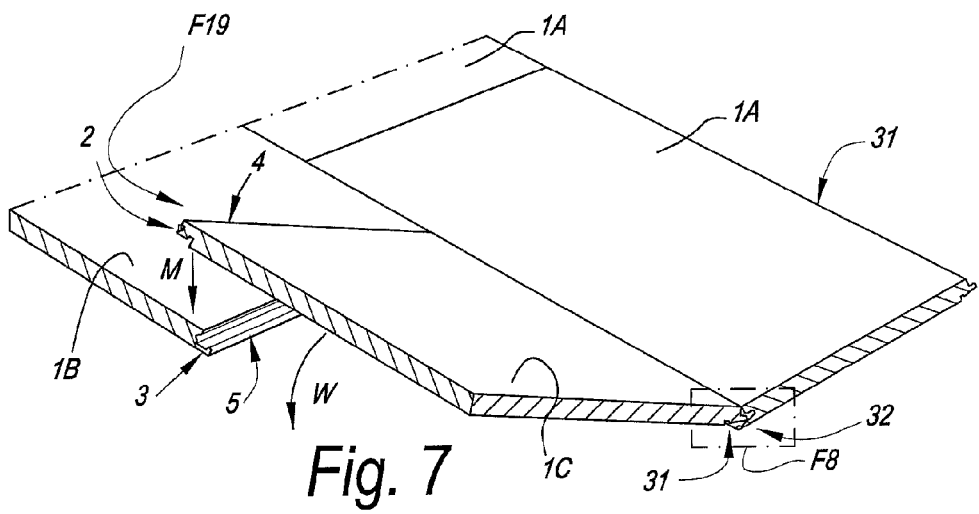
FIG. 7 represents in perspective how the floor panels from FIGS. 1 to 5 can be coupled to each other.
Figure 8:
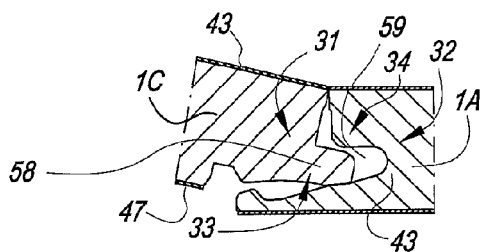
FIG. 8 in cross-section represents a view on the area indicated by F8 in FIG. 7.

In the most preferred embodiment, at the second pair of sides 31-32 coupling parts 33-34 will be used which allow at least a connection by means of an angling movement W, as this allows to install the floor panels 1 in a simple manner, as illustrated in FIGS. 7 and 8. Then, a newly to install floor panel 1C can be angled with its side 31 into the preceding row of floor panels 1A in a simple manner, such just next to a preceding floor panel 1B in the same row. When angling the panel down, the male part of the newly to install floor panel 1C thus also will automatically engage in the female part of the preceding floor panel 1B, without having to perform another operation. Thus, in the case of oblong floor panels 1, it is preferred that the so-called "push-lock" connection then will be situated at the short sides 4-5.

Figure 1:
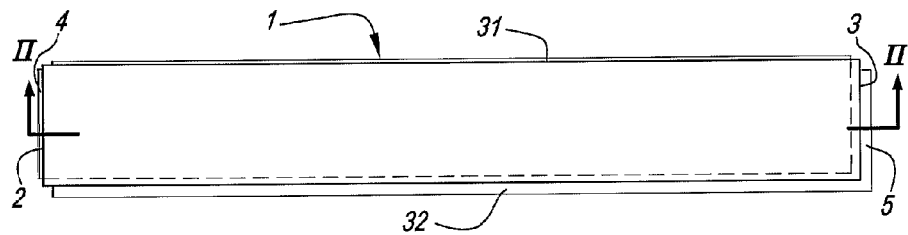
FIG. 1 schematically and in top view represents a floor panel according to the invention.
Figure 2:
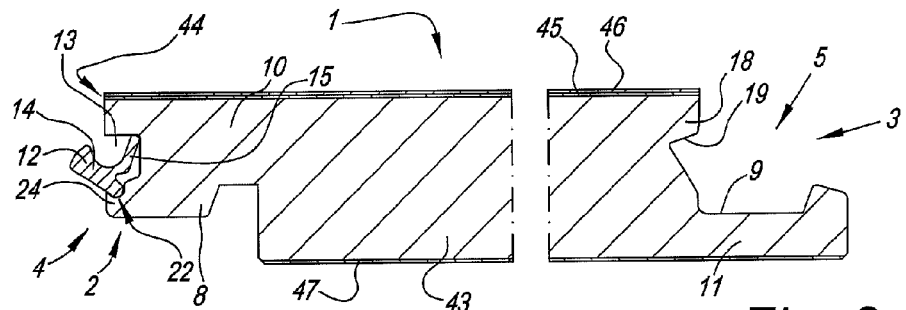
FIG. 2, at a larger scale, represents a cross-section according to line II-II in FIG. 1.

FIG. 1 represents that the strip is provided such over the length of the side 2 that it does not interfere with the coupling parts 33-34 of the second pair of sides 31-32. Thus, the strip extends only over a length which is smaller than the length L1 of the side 2 of the decorative usable surface of the panel 1. For further preferred embodiments of the strip and the distance over which the latter extends along the respective side, reference is made to the herein below also mentioned eighth independent aspect.

Figure 9:
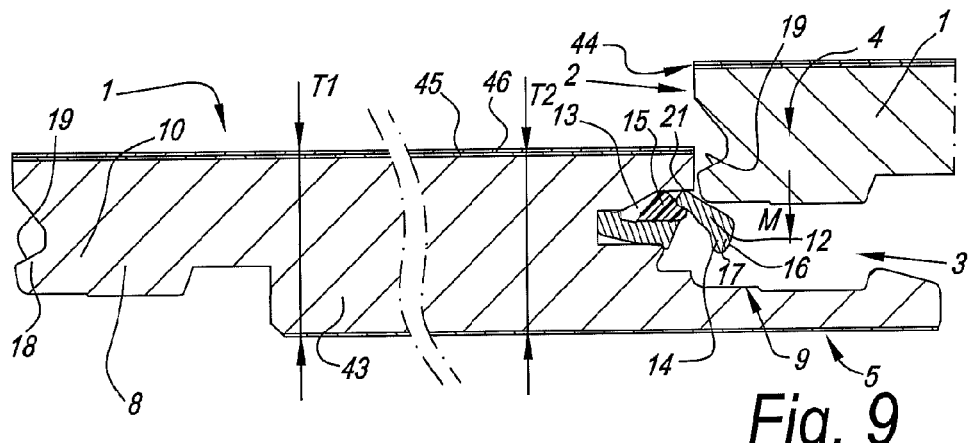
FIGS. 9 to 11, in views similar to FIGS. 2, 3 and 6, represent a variant.
Figure 10:
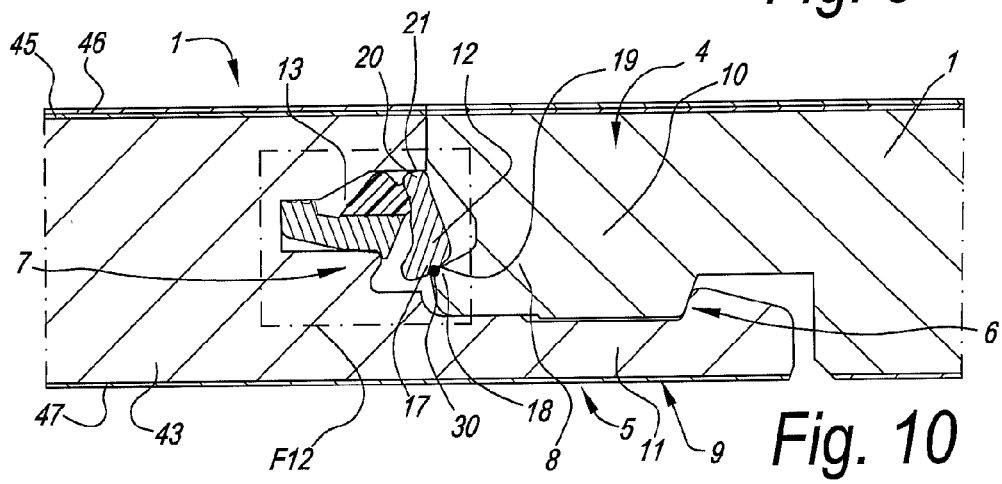
Figure 11:
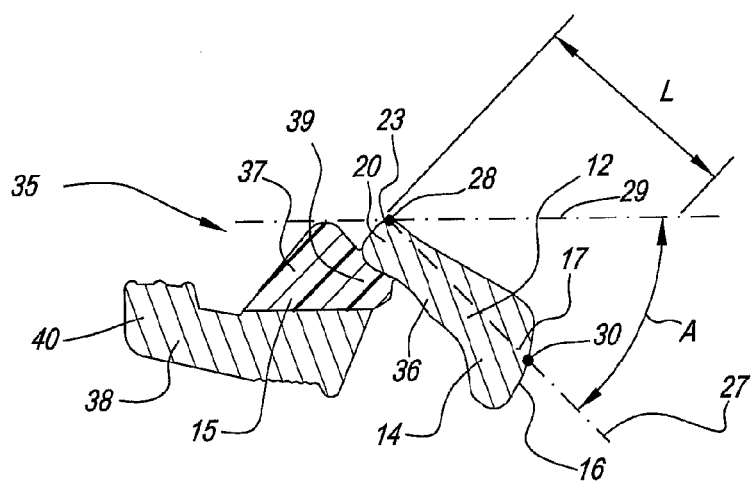

FIGS. 9 to 11 represent a variant, wherein the vertically active locking system 7 comprises a locking element 12 which is provided on the side 3 in the form of an insert, more particularly is provided in a recess 13 provided in the female part 9 for this purpose. The insert comprises a downward-directed lock-up body 14, which can cooperate with an upward-directed stop-forming surface 19 on the male part 8. FIG. 11 clearly represents that the orientation of the lock-up body 14 in the non-coupled condition has an angle A with the panel surface of less than 50°.

FIG. 11 further shows that the insert is designed such that it also shows the characteristics of the third aspect mentioned in the introduction. To this aim, the locking element 12 consists of a coextruded synthetic material strip 35, which is provided in a recess 13 and which, seen in cross-section, such as in the view of FIG. 11, is composed of two or more zones, in this case of three zones 36-37-38, which consist of synthetic materials with different features, wherein at least one of these synthetic materials relates to stabilized PVC (PolyVinyl Chloride). In the example, a first zone 36 is formed by the pivotable lock-up body 14, a second zone 37 by the hinge portion 39 and a third zone 38 by the clamping portion 40. In this case, at least the lock-up body 14 or the first zone 36 is realized in a harder and/or less flexible synthetic material, preferably in said stabilized PVC, than the hinge portion 39 or the second zone 37. This second zone 37 can be realized, for example, in polyurethane or a polyurethane-based synthetic material, such as in polyisocyanurate. Said third zone 38 can be realized in the same synthetic material or in a similar synthetic material as said first zone 36.

Thus, the press-on portion 15 preferably comprises an elastic material and more particularly a material which as such is suppler than the material of the lock-up body 14. Preferably, this is also synthetic material, and in the most preferred embodiment, the press-on portion 15 is realized in one piece with the lock-up body 14 by means of coextrusion. In the figures, the coextruded materials are represented with a different hatching.

Generally, it is noted that a locking element 12 in cross-section may have only minor dimensions, as this has to be integrated into the edge of floor panels which in practice have a thickness which mostly is less than 2 cm and in many cases even is less than 1 cm. The space which then is available for the locking element 12 thus often will be in the order of magnitude of only 5 millimeters or less. When, with such small dimensions, different supplenesses have to be built-in into the locking element, the possibilities thus will be limited if one wants to realize this in a traditional manner by working with different thicknesses. By now using coextrusion, according to the invention, a larger range of possibilities is created for building-in different supplenesses and thus also a different elasticity, depending on the intended effect.

The coextruded materials can consist of the same or a similar basic material and, for example, may differ from each other only in that certain components have been added to the one material or certain components are present to a larger extent. In a practical embodiment, the entire strip consists of PVC, however, the more supple part is formed of PVC to which a larger amount of plasticizer has been added.

It is noted that, as represented in the figures, the locking portion 17 of the lock-up body 14 preferably is realized in the form of a widened end of the lock-up body 14, which offers more space for realizing the locking portion with a desired surface. Such surface preferably is designed such that, when using the panels or floor panels, the lock-up body 14 can pivot out to a larger extent and a vertical locking remains present and even an increasingly intense cooperation is created between the locking portion 17 and the locking portion 18 of the opposite panel 1. So, for example, a so-called cam surface can be used, such as described in WO 2009/066153.

As represented in the figures, the locking element 12 and the recess 13 are realized such that this locking element 12, in the free non-coupled condition of the respective floor panel 1, is located with its locking portion 17 entirely outside of the recess 13.

Figure 12:
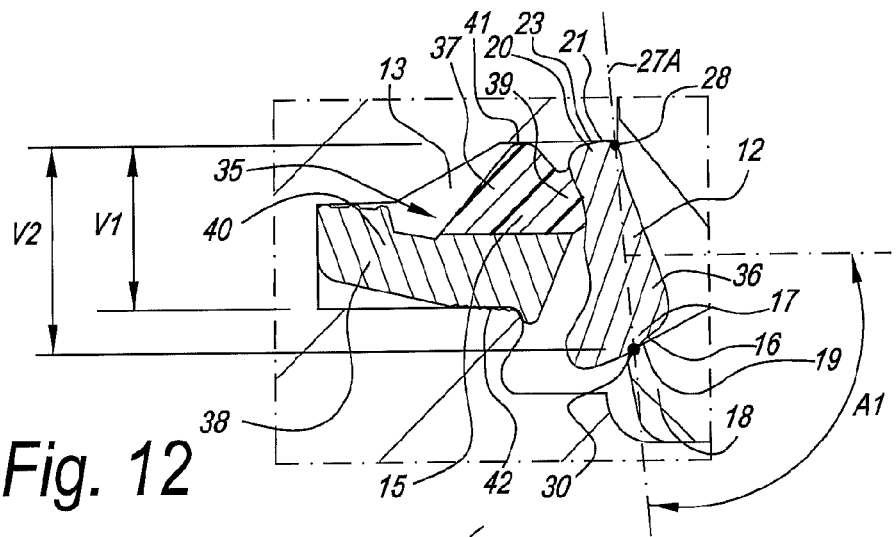
FIG. 12, at a larger scale, represents a view on the area indicated by F12 in FIG. 10.

FIG. 12 represents that the example also shows the characteristics of the second aspect mentioned in the introduction. To this aim, the locking element 12 consists of a strip 35, which is attached in a recess 13 in the panel 1, wherein attachment provisions are present, which retain the strip 35 in the recess 13. In this case, the attachment provisions are formed on the press-on portion 15, wherein this press-on portion is provided with an attachment portion with a clamped part formed by the clamping portion 40 and the hinge portion 39. Thus, the attachment provision actually relates to the clamping of the attachment portion in the recess 13. Actually, the attachment provisions are connected to the lock-up body 14 by means of the hinge portion 39. This means that the lock-up body 14, irrespective of the attachment of the strip 35 in the recess 13, can perform a pivoting movement for coupling two of such panels 1. In the coupled condition, as represented here, the lock-up body 14 extends over a vertical distance V1 which is smaller than 1.4 times the vertical distance V2 defined by the aforementioned attachment provisions. In this case, the distance V2 is defined by the largest vertical distance between the clamping surfaces 41-42 on opposite sides of the strip 35. The distance V2 is the vertical distance defined by the tangent point 28 and the center point 30 of the stop-forming locking portion 17. In the example of figure, the distance V2 clearly is larger than the distance V1.

FIG. 12 further represents that the lock-up body 14 in coupled condition adopts an orientation which forms an angle A1 which is larger than the also above-defined angle A. The difference is at least 5° and in this case even more than 10 or 15°. In this manner, a strong tensioning effect is obtained.

Preferably, said angle A1, as in the example of FIG. 12, is smaller than 90° and preferably also smaller than 50°.

Figure 13:
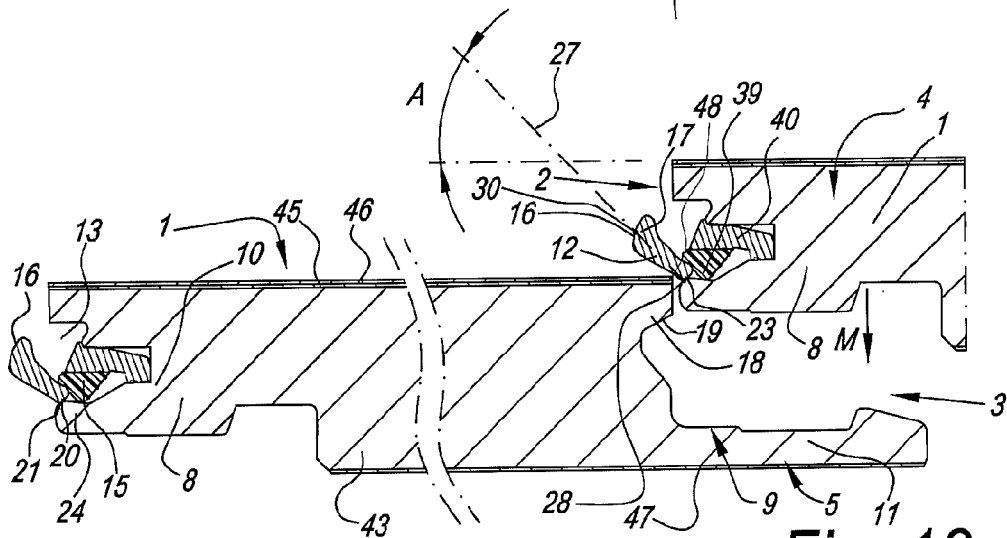
FIGS. 13 and 14, in a view similar to that of FIG. 9, represent still other variants.

FIG. 13 represents another variant, wherein the insert of FIGS. 9 to 12 is provided in a recess 13 realized in the male part 8. To this aim, the lock-up body 14 is directed upward. FIG. 13 thus forms an example of the first and the third aspect. FIG. 13 deviates from the second aspect only in that the lock-up body is directed upward instead of downward. However, it is clear that said distances V1 and V2 here also show the inventive relative dimensions of the second aspect.

Figure 14:
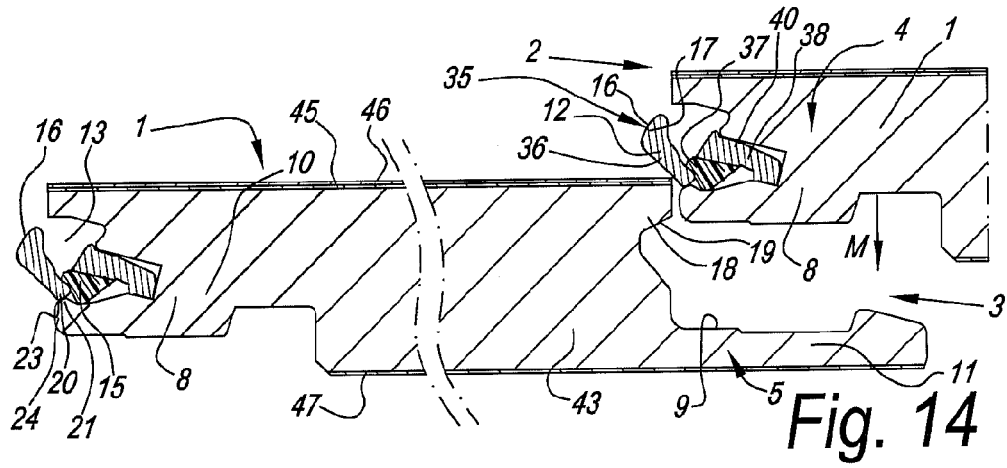

FIG. 14 represents another variant, based on FIG. 13, wherein the strip 35 is provided in a globally inclined-directed recess 13 in the male part 8. In this manner, a better utilization is obtained of the core material 43 which is present. It is clear that orientations deviating from the horizontal can also be applied when such strip 35 is provided in the female part 9.

Figure 15:
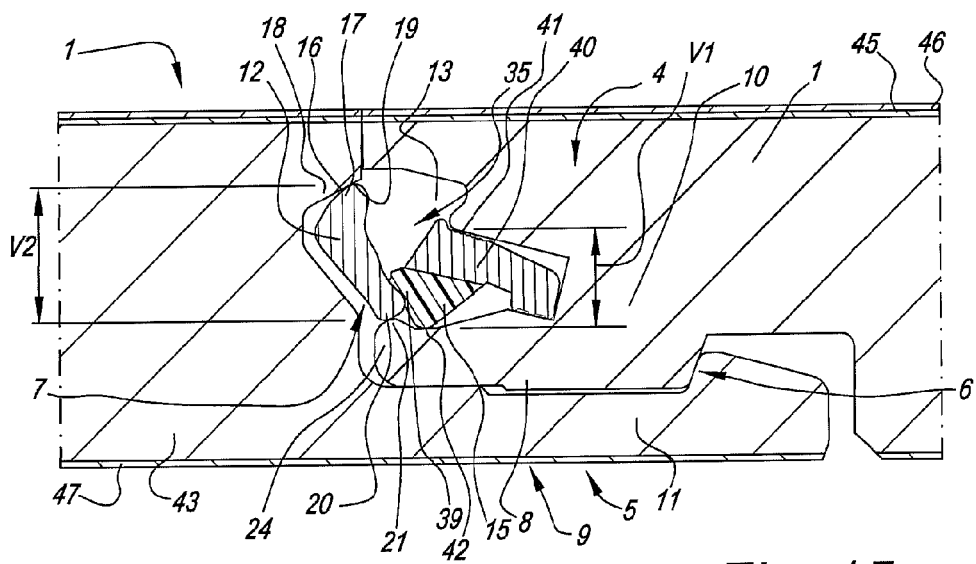
FIG. 15 represents two floor panels, which are made according to FIG. 14, in coupled condition.

FIG. 15 represents the coupled condition of two floor panels, such as in FIG. 14. Herein, it is also clear that the inventive relative dimensions V1 and V2 of the second aspect are applied, although here an upward-directed lock-up body 14 is concerned.

It is clear that the coupling according to the invention can be applied in combination with any floor panel 1, such as in so-called prefabricated parquet, more particularly in so-called "engineered wood". In such case, this relates to floor panels which are composed of a core material composed of strips, a top layer of wood, as well as a backing layer of wood. The top layer then consists of wood of a good quality, which functions as a visible decorative layer. The backing layer can consist of a cheaper wood species. The strips preferably also consist of a cheaper, for example, soft wood species. However, it is preferred that on the ends of the floor panels 1 strips of a material are applied which is relatively stable and is suitable for providing therein the desired profile forms, for example, milling them therein. In a practical embodiment, these strips consist of MDF (Medium Density Fiberboard) or HDF (High Density Fiberboard). It is clear that the invention can also be applied in combination with other forms of "engineered wood", for example, when the core consists of a single continuous MDF/HDF board or of a plywood board.

The figures respectively represent the application in panels which substantially consist of a core material 43 and a decorative top layer 44. More particularly, in the examples a laminate floor panel is concerned, in this case a so-called DPL (Direct Pressure Laminate), which, in a known manner, is composed of a core material 43, for example, of MDF or HDF, a top layer 44 on the basis of one or more layers impregnated with resin, for example, a printed decor layer 45 and a so-called overlay 46, as well as a backing layer 47, which also consists of one or more layers impregnated with resin, wherein the whole is consolidated under pressure and heat.

Of course, applications in other floor panels 1 are not excluded.

Generally, the invention shows its advantages best with floor panels 1 having a total thickness of less than 1 centimeter.

Generally, it is preferred that a locking element according to the invention provides for a stable support in vertical direction, whereas in horizontal direction, thus, in pivoting direction, a supple movability is achieved. Applying coextruded parts assists therein.

It is also noted that the distance V1 from FIG. 12 also corresponds to the vertical distance defined by the recess 13. This distance is preferably smaller than half of the thickness T1 of the panel 1 and the thickness T2 of the core material 43.

FIGS. 6 and 11 also clearly show the length L of the lock-up bodies 14 of the respective locking elements 12. Preferably, this length L, as in the examples, is at least 30 or 35 percent of the thickness T1 of the panel or of the thickness T2 of the core material 43. A length of more than 50 percent of the thickness T1 or T2 is not excluded.

FIGS. 13 to 17 illustrate another, sixth, independent aspect of the present invention. The sixth aspect relates to panels 1, which, at least at two opposite sides 2-3, comprise coupling parts 4-5, by which two of such panels 1 can be brought in a coupled condition; wherein these coupling parts 4-5 form a horizontally active locking system 6 and a vertically active locking system 7; wherein the horizontally active locking system 6 comprises a male part 8 and a female part 9, which allow that two of such panels 1 can be connected to each other at said sides 2-3 by providing one of these panels 1 with the pertaining male part 8, by means of a downward movement M, in the female part 9 of the other panel 1; wherein the vertically active locking system 7 comprises a locking element 12, which, in the form of an insert, is provided in one of the respective sides 2, in the examples in the side 2 which is provided with the male part 8, wherein this locking element 12 comprises at least an upward-directed lock-up body 14; and wherein the lock-up body 14, at one extremity, forms a stop-forming locking portion 17, which can cooperate with a locking portion 18 of a similar coupled panel 1. The particularity of the independent sixth aspect consists in that the lock-up body 14 comprises a press-on portion 15 which laterally acts on the lock-up body 14, and that the locking element 12 consists of a coextruded synthetic material strip 35 with, seen in cross-section, a plurality of zones 36-37-38 of synthetic material with different characteristics, namely, on the one hand, at least a first zone 36 formed by said lock-up body 14, and, on the other hand, at least a second zone 37 situated in a press-on portion 15 which laterally engages on the lock-up body 14. In the examples, the second zone 37 relates to a hinge portion 39 which forms the connection between the actual press-on portion or clamping portion 40 and the lock-up body 14.

By means of the sixth aspect, an improved snap-in effect is obtained in locking systems of the specific type mentioned in the introduction, in the cases in which the lock-up body 14 is directed upward. In such cases, snapping-in can be awkward in the state of the art systems. As illustrated in FIGS. 13 and 14, the upward-directed lock-up body 14, when coupling two of such panels 1 by means of a downward movement M, slides over a sharp edge, in this case over the upper edge 48 of the opposite panel 1. The more flexible synthetic material of the hinge portion 40 provides for a suppler downward-directed coupling movement M, wherein the risk or the tendency that the panels 1 are pushed apart from each other in horizontal direction H and a less qualitative coupling will be created, is minimized. The sixth aspect is particularly interesting when applying laminate panels. In this manner, the risk of damage of the thin top layer 44 consisting of laminate when coupling the panels 1 is minimized.

FIG. 16 also illustrates the particular characteristic of an independent seventh aspect. This seventh aspect relates to panels which, at least at two opposite sides 2-3, comprise coupling parts 4-5, by which two of such panels 1 can be brought in a coupled condition; wherein these coupling parts 4-5 form a horizontally active locking system 6 and a vertically active locking system 7; wherein the horizontally active locking system 6 comprises a male part 8 and a female part 9, which allow that two of such panels 1 can be connected to each other at said sides 2-3 by providing one of these panels 1 with the pertaining male part 8, by means of a downward movement M, in the female part 9 of the other panel 1; wherein the vertically active locking system 7 comprises a locking element 12, which, in the form of an insert, is provided in one of the respective sides 2-3; wherein this locking element 12 comprises at least an upward-directed lock-up body 14; and wherein the lock-up body 14, at one extremity, forms a stop-forming locking portion 17, which can cooperate with a locking portion 18 of a similar coupled panel 1, wherein the locking element 12 consists of a strip 35 which is attached in a recess 13 in the panel 1. The inventive characteristic of the seventh aspect consists in that said recess 13 is at least bordered by an upper surface 49, wherein this upper surface 49 defines a minimum distance D1 and a maximum distance D2 to the upper surface 50 of the panel 1, wherein said maximum distance D2 is minimum 130 percent and still better minimum 150 percent of said minimum distance D1. Hereby, it is obtained that the upper surface 50, at the side 2 of the panel 1 in which the recess 13 is formed, can remain more stable when in use. In the case of thin top layers 44, as this is the case with laminate panels or veneer panels, this is of particular importance, as in such top layers 44, relevant tensile stresses may exist which can lead to curling up of the top layer 44. Preferably, said minimum distance D1 is minimum 10 percent and still better 20 percent of the thickness T1 of the panel 1.

As represented in FIG. 16, the lock-up body 14, opposite to the extremity forming the locking portion 17, preferably comprises a support portion 20 which rests against a support surface 21 pertaining to the respective panel 1 and, more particularly, is rotatable against it. In the example of FIG. 16, this support surface 21 is positioned on the lower surface 51 of the recess 13. The lower surface 51 of the recess 13 defines, in this case at the location of the support surface 21, a minimum distance D3 with the lower surface 52 of the panel 1, which is minimum 130 percent and still better minimum 150 percent of said minimum distance D1 between the upper surface 49 of the recess 13 and the upper surface 50 of the panel 1. Hereby is obtained that the locking element 12, and more particularly the lock-up body 14, can be sufficiently supported by the core material 43. Preferably, at least 20% and still better at least 40% of this minimum distance D3 is formed by the material of the coupling part 2, in this case of the male coupling part 8, in which the strip 35 is provided. Preferably, also at least 20% and still better 40% of this minimum distance D3 is formed by the material of the opposite coupling part, in this case by the material of the female coupling part 9. At the location of this minimum distance D3, the male coupling part 8 preferably, such as here, is directly supported by the female coupling part 9 or, in other words, vertically active locking surfaces 53 are formed at the location of this minimum distance D3.

Preferably, the minimum thickness D4 of the upward-directed hook-shaped part 11 of the female coupling part 9, such as here, is smaller than or equal to the minimum distance D1 between the upper surface 49 of the recess 13 and the upper surface 50 of the panel 1. If this thickness D4, however, would be larger, then it will preferably still be smaller than one and a half times the minimum distance D1.

Preferably, the maximum thickness D5 of the upward-directed hook-shaped part 11 of the female coupling part 9 is smaller than the maximum distance D3 between the lower surface 51 of the recess 13 and the lower surface 52 of the panel 1. Hereby, an embodiment can be obtained which, apart from by means of a downward coupling movement M, can also be coupled by means of a horizontal shifting movement of the coupling part towards each other. In dashed line 54 is represented that according to deviating embodiments the maximum thickness D5 of the upward-directed hook-shaped part 11 can also be larger. Preferably, this distance D5, however, is smaller than half of the thickness T1 of the panel 1.

In the coupled condition of two of such panels 1, the upward-directed hook-shaped part 11 of the female coupling part 9 extends distally in horizontal direction H, preferably beyond the deepest point 55 of said recess 13. Preferably, it extends beyond this even further over a horizontal distance which is larger than one fourth of the thickness T1 of the panel 1. Preferably, horizontally active contact surfaces 56 are formed, which are part of the horizontally active locking system 6, wherein these contact surfaces 56 are situated in horizontal direction H beyond the deepest point 55 of said recess 13, preferably at a horizontal distance thereof which is larger than one fourth of the thickness T1 of the panel 1. Hereby, a more stable horizontally active locking system 6 is obtained.

Figure 17:
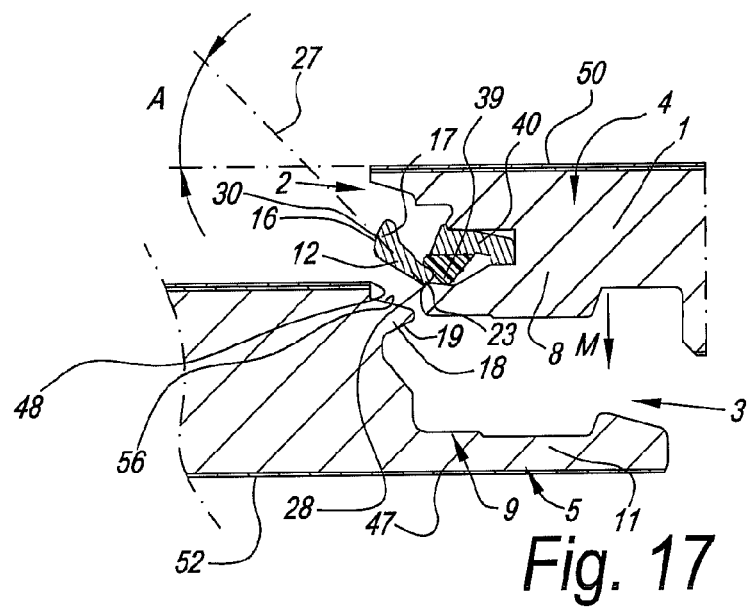
FIG. 17, in a view similar to that of FIG. 4, represents a variant.

FIG. 17 represents another embodiment of a locking system with an upward-directed lock-up body 14 which is situated on one side 2, wherein, next to the upper edge 48 of the opposite side 3, a guide surface 56 is realized. Hereby, a suppler downward coupling movement M can be realized.

It is clear that the FIGS. 16 and 17 also form examples of the first, second and third aspect mentioned in the introduction and that one or more of these aspects and/or the preferred embodiments thereof can also be applied in combination with the herein above-mentioned sixth and/or seventh aspect of the invention.

Figure 18:
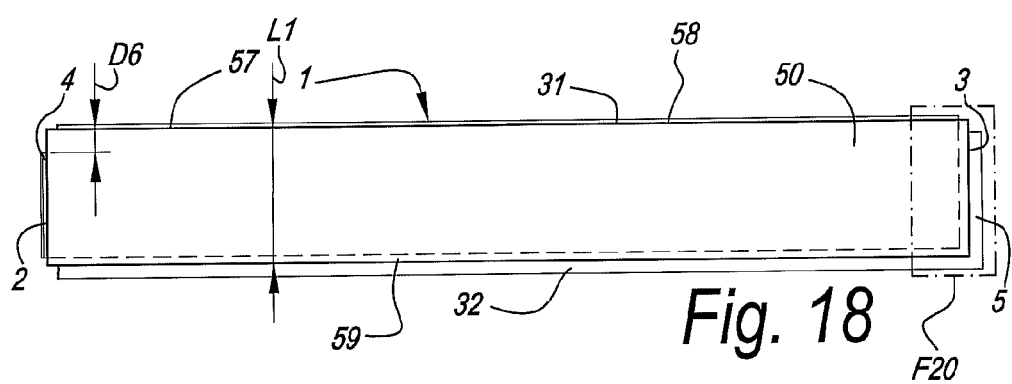
FIG. 18, in a view similar to that of FIG. 1, represents a variant.

FIG. 18 represents an embodiment which, amongst others, shows the characteristics of an independent eighth aspect. This eighth independent aspect relates to panels, which, at least at two opposite sides 2-3, comprise coupling parts 4-5, by which two of such panels 1 can be brought in a coupled condition; wherein these coupling parts 4-5 form a horizontally active locking system 6 and a vertically active locking system 7; wherein the horizontally active locking system 6 comprises a male part 8 and a female part 9, which allow that two of such panels 1 can be connected to each other at said sides 2-3 by providing one of these panels 1 with the pertaining male part 8, by means of a downward movement M, in the female part 9 of the other panel 1; wherein the vertically active locking system 7 comprises a locking element 12, which, in the form of an insert, is provided in one of the respective sides 2-3; wherein this locking element 12 comprises at least a, preferably pivotable, lock-up body 14; and wherein the lock-up body 14, at one extremity, forms a stop-forming locking portion 17, which can cooperate with a locking portion 18 of a similar coupled panel 1. The eighth aspect aims at realizing a supple coupling movement M for such panels. According to a first possible embodiment, the aforementioned lock-up body 14 to this aim extends, as represented, along said respective side 2 from at a distance D6 from the upper edge 57 of one of the remaining two opposite sides 31, wherein this distance D6 is half a centimeter or more. Preferably, this distance D6 is less than half of the length L1 of the usable surface at the location of the respective side 2 and preferably more than 10 percent of this length L1. Preferably, at the remaining two opposite sides 31-32, coupling parts 33-34 are applied, which allow a coupling by means of an angling movement M, such as the coupling parts 33-34 from FIG. 8. In this manner, an installation technique as illustrated in FIG. 7 becomes possible. Preferably, the coupling parts 33-34 of the remaining two opposite sides 31-32 substantially are realized as a tongue 58 and a groove 59, wherein said distance D6 then preferably is defined in respect to the upper edge 57 of the side 31 which is provided with the tongue 58.

Figure 19:
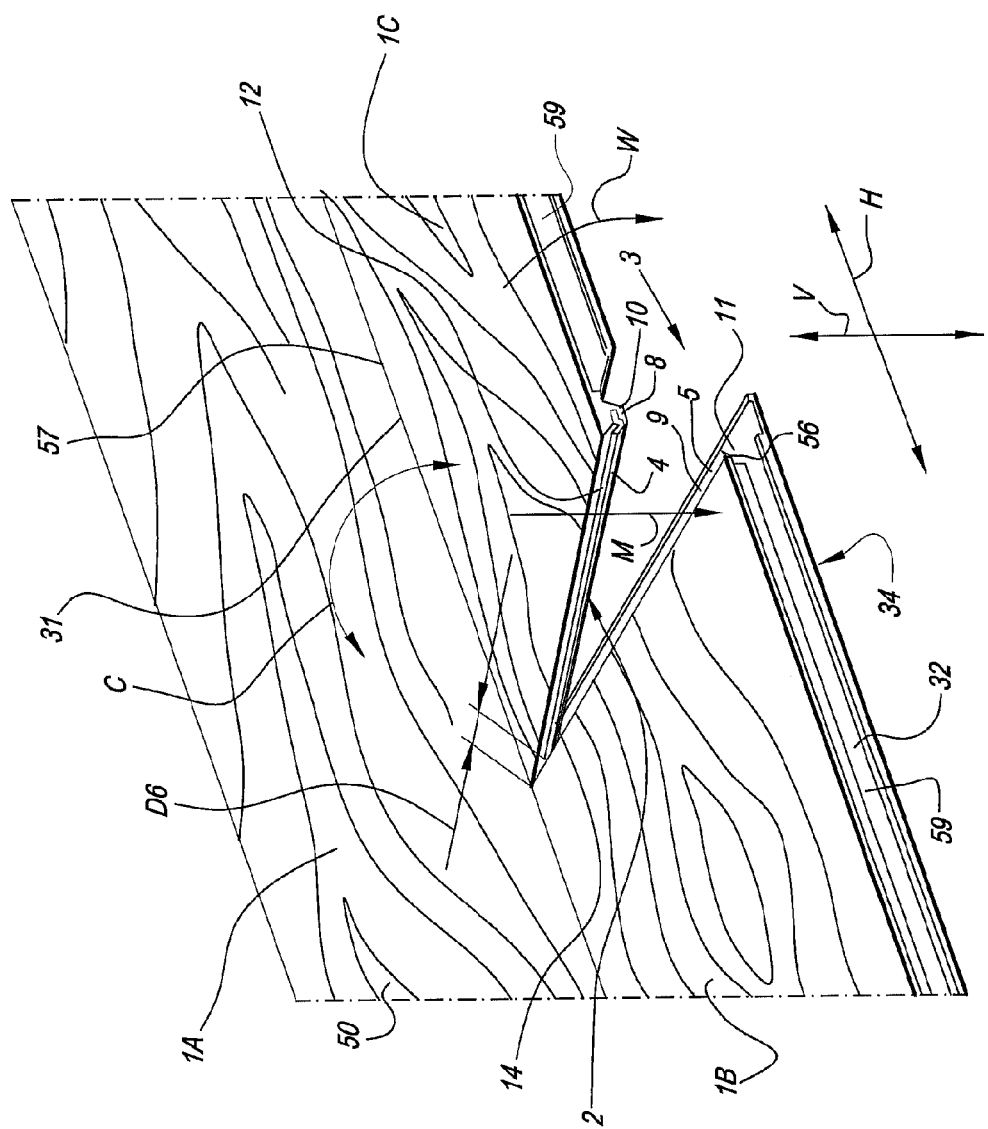
FIG. 19 represents how the panels of the invention can be coupled to each other, according to a view indicated by F19 in FIG. 7.

FIG. 19 illustrates a second possible embodiment of said eighth aspect, wherein said lock-up body 14 extends along said respective side 2 from at a distance D6 from the upper edge 57 of one of the remaining two opposite sides 31, wherein said remaining two opposite sides 31-32 comprise coupling parts 33-34, which allow that these coupling parts 33-34 can be provided in each other by means of a angling movement W, such as the coupling parts 33-34 of FIG. 8, wherein this angling movement W results in said downward movement M at the respective two opposite sides 2-3, and that said distance D6 is such that the first contact between the respective two opposite sides 2-3 at the location of said lock-up body 14 occurs in a position in which the planes of the panels 1 to be coupled enclose a mutual angle C of more than 145° or still better of more than 160°.

FIG. 19 shows the mutual position of the panels 1A-1C, wherein the first contact between the short sides 2-3 occurs at the location of the lock-up body 14. From this relatively flat mutual orientation, the panels 1A-1B can be pushed towards each other in a supple manner, by angling panel 1C further downward in respect to panel 1A until they are situated in a common plane. Automatically, a downward coupling movement M is created at the short sides 2-3.

According to its two possible embodiments, the eighth aspect delays the contact between the locking element 12 and the opposite panel edge 3, which has to be coupled with the latter, and provides for that the actual snap effect is only a limited part of the coupling movement. By concentrating the snap effect, the forces on the lock-up body 14 are performed more simultaneously and are distributed more evenly over the length of the lock-up body. Hereby, a more supple coupling movement M still can result in a clearly audible, reassuring snapping sound.

FIGS. 20 and 21 also represent that the female coupling part 9, more particularly the upward-directed hook-shaped part 11, can be realized in accordance with the international application PCT/IB2011/054223, wherein horizontally active contact surfaces 56 are formed which are part of the horizontally active locking system 6, wherein these contact surfaces 56, seen in a top view of the panel 1, globally extend in one or more directions different from the direction of said upper edges 48.

Preferably, said contact surfaces 56, seen in a top view of the panel 1, globally extend in a direction forming an angle B with the upper edges 48, wherein this angle B is situated between 0.5° and 5°, and still better between 1° and 3°, as is the case in the example of FIG. 20.

Preferably, said contact surfaces 56, seen in a top view of the panel 1, just as is the case here, globally extend on a straight line forming an angle B with the upper edge 48 of the panels 1.

Seen in the top view of this example, the contact surfaces 56 extend continuously according to a straight line over an operative distance D7 of more than 50% or here of even more than 75% of the width L1 of the decorative side or the usable surface of the panel 1. Also in the case of discontinuous contact surfaces 56 and/or of not straight, thus, curved contact surfaces, the overall operative distance D7 of the contact surfaces 56 preferably is maintained. By "operative distance D7" is meant that in a coupled condition of two panels 1 effectively a contact is created over this distance D7.

FIG. 21 represents an example of contact surfaces 56 which are interrupted and wherein the actual contact surface 56 consists of two parts. Preferably, the contact surfaces 56 of both parts extend together, in the case of an interruption thereof, such as here, over an overall operative distance D7 of more than 30% or here of even more than 50%, or approximately 60% of the width L1 of the decorative side or the usable surface of the panel 1. Also in the case that there should be more than two parts, the common operative distance D7 of all these parts preferably is more than 30% or more than 50% of the width L1 of the decorative side of the panel 1.

It is clear that contact surfaces 56 which extend otherwise than parallel to the pertaining upper edge 48, can be applied in combination with any aspect of the invention. However, it is not excluded that the contact surfaces 56 in fact may extend entirely or partially almost parallel or parallel to the pertaining upper edge 48.

Figure 23:
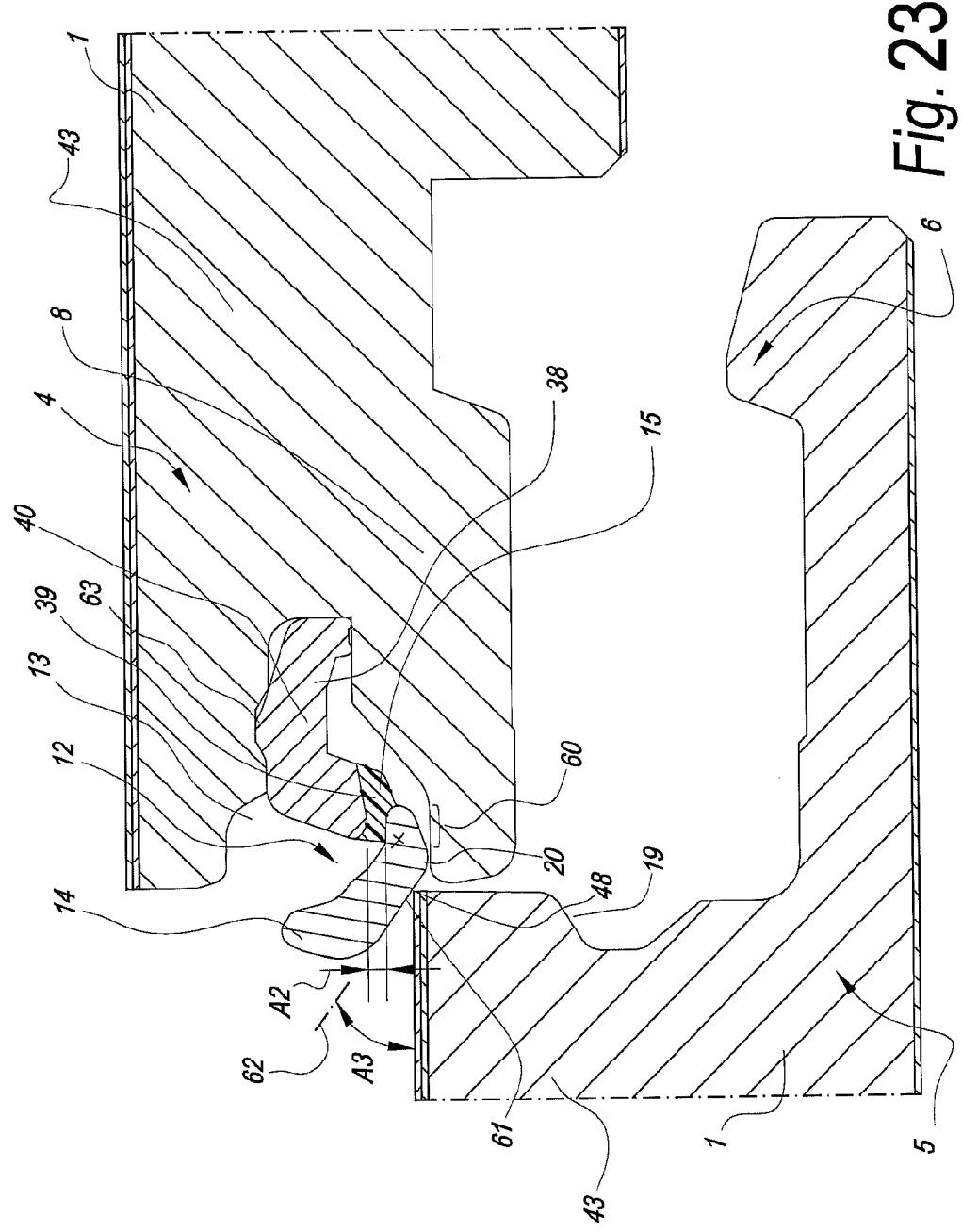
FIG. 23 represents the variant from FIG. 22 during the downward coupling movement.

FIGS. 22 and 23 represent a variant showing, amongst others, the particularities of the fourth and fifth aspects mentioned in the introduction.

A first particularity consists in that the lock-up body 14 and the attachment portion, more particularly the clamping portion 40, in the non-coupled condition, horizontally extend at least for a part 60, as represented in FIG. 23, underneath each other, however, herein maintain a vertical distance between each other.

A second particularity consists in that in the coupled or non-coupled condition of two of such panels, in this case both, said support surface 21, in horizontal direction, extends at least for a part vertically underneath said elastic bending zone or the hinge portion 39 and underneath said attachment portion or more particularly the clamping portion 40.

It is clear that these particularities do not necessarily have to be commonly present in a panel.

FIG. 23 further represents that the smallest vertical distance A2 between the respective portions of the lock-up body 14 and the clamping portion 40, which extend underneath each other, is smaller than 0.4 millimeters or at least is smaller than 5 percent of the vertical height V of the lock-up body 14 in free condition.

As aforementioned, the locking element 12 comprises an elastic bending zone or hinge portion 39, which forms a connection between the clamping portion 40 and the pivotable lock-up body 14. This elastic bending zone extends between the respective portions 60 of the lock-up body 14 and the clamping portion which extend underneath each other.

In the examples, said locking element is provided in said male part 8, and said pivotable lock-up body 14 is directed upward. Herein, the pivotable lock-up body 14, in the coupled, however, also in the non-coupled condition, extends horizontally at least for a part underneath the attachment portion or clamping portion 40.

FIG. 23 further also represents that the lock-up body 14 has a surface 61 which, when performing said downward movement, comes into contact with the upper edge 48 of the other panel 1, wherein this surface 61, when this contact is effected, shows a tangent line 62 forming an angle A3 of 20 to 45° with the upper surface of the panels 1. This measure promotes a smooth mounting of the panels 1.

The embodiment of FIGS. 22 and 23 is also particular in that the insert, more particularly the clamping portion 40, is provided with a locking part, in this case a protrusion 63, which allows to snap this clamping portion into the core material 43 of the panel 1, more particularly into a recess in the core material 43 provided for this purpose.

Figure 24:
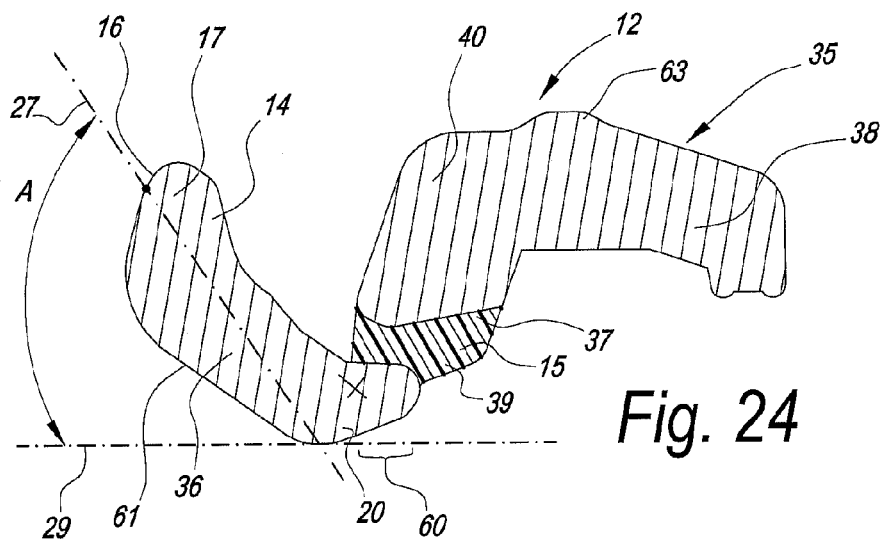
FIGS. 24 and 25 represent some more inserts which can be applied as locking elements in the panels of the invention.

It is clear that the examples from FIGS. 23 and 24 further also can show, for example, the characteristics of the third aspect mentioned in the introduction and/or the also above-mentioned sixth aspect.

FIG. 24 represents the insert which is applied in FIGS. 22 and 23. Said pivotable lock-up body 14, in the non-coupled condition, adopts an orientation which forms an angle A of less than 60° with the panel surface.

Figure 25:
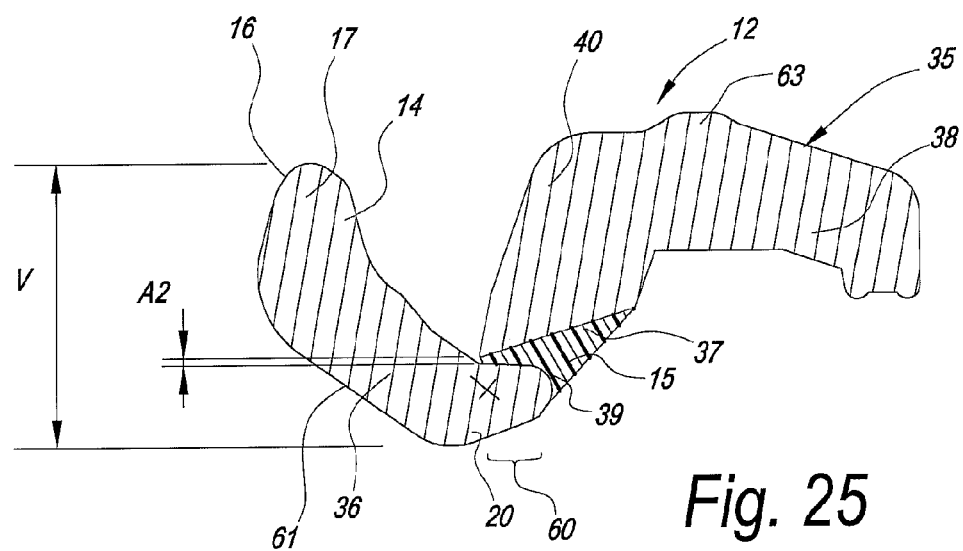

FIG. 25 represents a variant of an insert which may be applied in embodiments similar to that of FIGS. 22 and 23. In the example of FIG. 25, the vertical distance between the respective portions 26, which extend horizontally underneath each other, increases from the lock-up body 14 towards the clamping portion 40.

It is clear that the inserts from FIGS. 9 through 25 preferably consist of a coextruded synthetic material strip, such as the synthetic material strip of the third aspect, and that those as such form the object of further independent aspects of the invention.

It is also noted that, where within the scope of the invention a vertical direction is mentioned, such as a locking in vertical direction, in fact reference is made to floor panels. In general, this means the direction perpendicular to the plane of the panels, independent of the fact whether this relates to floor panels, ceiling panels, wall panels or other panels. Where a horizontal direction is mentioned, such as a locking in horizontal direction, this also refers to floor panels. In general, this means the direction in the plane of the panels and perpendicular to the respective edge of the panel. Where a downward movement is mentioned, this generally means a movement of the male coupling part towards the female coupling part in a direction extending crosswise to the plane of the panels. Such movement on one pair of sides preferably is obtained such as illustrated in FIG. 7, namely by performing an angling movement W at the second pair of sides. When upward-directed or downward-directed is mentioned, then this generally means directed towards the decorative side, directed away from the decorative side, respectively.

It is clear that by the usable surface of a panel the surface is meant which is visible or usable in the final covering, which consists of a plurality of such coupled-together panels. Thus, in other words, this relates to the surface of the decorative side of the panels. Further, it is clear that various ones of said independent aspects can also be applied with other separate strips with lock-up function in vertical direction than strips with pivotable lock-up bodies. For example, the invention can also be applied with strips comprising a lock-up body which can be shifted in horizontal direction. When lock-up bodies are mentioned which are directed upward, downward, respectively, this then relates to a distal surface of the lock-up body, which surface, seen from the bottom towards the top, is directed outward, inward, respectively.

The present invention is in no way restricted to the embodiments described by way of example and represented in the figures; on the contrary, such panels may be realized in various forms and dimensions without leaving the scope of the invention.

The invention claimed is:

1. A panel, which, at least at two opposite sides, comprises coupling parts, with which two of such panels can be brought in a coupled condition;
wherein these coupling parts form a horizontally active locking system and a vertically active locking system;
wherein the horizontally active locking system comprises a male part and a female part, which allow that two of such panels can be connected to each other at said sides by providing one of these panels with the pertaining male part, by means of a downward movement, in the female part of the other panel;
wherein the vertically active locking system comprises a locking element, which, in the form of an insert, is provided in the side having the male part;
wherein this locking element comprises at least a pivotable lock-up body, said lock-up body being directed upward;
wherein the lock-up body, at one extremity, forms a stop-forming locking portion, which can cooperate with a locking portion of a similar coupled panel, the locking element comprising a strip which is attached in a recess in the panel by means of an attachment portion which retains the strip in the recess, wherein said pivotable lock-up body in the non-coupled condition extends horizontally at least for a part underneath the attachment portion, however, wherein a vertical mutual distance is maintained between the lock-up body and the attachment portion;
wherein the locking element comprises an elastic bending zone, which forms a connection between the attachment portion and the pivotable lock-up body;
wherein the bending zone is a hinge portion; and
wherein the bending zone and the lock-up body are formed from synthetic material with different material characteristics such that a material of the bending zone is more flexible than a material of the lock-up body.

2. The panel of claim 1, wherein the smallest vertical distance between the respective portions of the lock-up body and the attachment portion is smaller than 0.4 millimeters.

3. The panel of claim 1, wherein the locking element consists of a coextruded synthetic material strip with, seen in cross-section, a plurality of zones of synthetic material with different characteristics including at least a first zone formed by said lock-up body and at least a second zone formed by said elastic bending zone.

4. The panel of claim 1, wherein said pivotable lock-up body, in the non-coupled condition, adopts an orientation which forms an angle of less than 60° with the panel surface.

5. The panel of claim 1, wherein said lock-up body, in the coupled condition of two of such panels, extends over a vertical distance which is smaller than 1.4 times the vertical distance defined by said attachment portion.

6. The panel of claim 1, wherein said pivotable lock-up body, in the coupled condition, extends horizontally at least for a part underneath the attachment portion.

7. The panel of claim 1, wherein the lock-up body defines a surface which, when performing said downward movement, comes into contact with an upper edge of the other panel, wherein the surface, when said contact occurs, shows a tangent line forming an angle (A3) of 45° or less with an upper surface of the panels.

8. The panel of claim 1, wherein the lock-up body has a surface which, when performing said downward movement, comes into contact with an upper edge of the other panel, wherein the surface, when contact is effected, shows a tangent line forming an angle (A3) of 20 to 45° with an upper surface of the panels.

* * * * *